US009857958B2

(12) United States Patent
Ma et al.

(10) Patent No.: US 9,857,958 B2
(45) Date of Patent: Jan. 2, 2018

(54) SYSTEMS AND USER INTERFACES FOR DYNAMIC AND INTERACTIVE ACCESS OF, INVESTIGATION OF, AND ANALYSIS OF DATA OBJECTS STORED IN ONE OR MORE DATABASES

(71) Applicant: Palantir Technologies Inc., Palo Alto, CA (US)

(72) Inventors: Jason Ma, Mountain View, CA (US); Aaron Davidson, Berkeley, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 370 days.

(21) Appl. No.: 14/696,069

(22) Filed: Apr. 24, 2015

(65) Prior Publication Data

US 2015/0309719 A1    Oct. 29, 2015

Related U.S. Application Data

(60) Provisional application No. 61/985,403, filed on Apr. 28, 2014.

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0481* (2013.01); *G06F 3/1407* (2013.01); *G06F 17/30994* (2013.01)

(58) Field of Classification Search
CPC ..................................... G06F 3/0484
See application file for complete search history.

(56) References Cited

U.S. PATENT DOCUMENTS 5,109,399 A    4/1992  Thompson
5,329,108 A    7/1994  Lamoure
(Continued)

FOREIGN PATENT DOCUMENTS

AU    2014250678    2/2016
DE    102014103482    9/2014
(Continued)

OTHER PUBLICATIONS

"A Quick Guide to UniProtKB Swiss-Prot & TrEMBL," Sep. 2011, pp. 2.
(Continued)

*Primary Examiner* — Peiyong Weng
(74) *Attorney, Agent, or Firm* — Knobbe Martens Olson & Bear LLP

(57) ABSTRACT

Embodiments of the present disclosure relate to user interfaces and systems that may enable dynamic and interactive access of, investigation of, and analysis of data objects stored in one or more databases. The data objects may be accessed from the one or more databases, and presented in multiple related portions of a display. In particular, the system provides a time-based visualization of data objects (and/or properties associated with the data objects) to a user such that the user may, for example, determine connections between various data objects, observe flows of information among data objects, and/or investigate related data objects.

9 Claims, 20 Drawing Sheets

(51) Int. Cl.
  *G06F 3/14* (2006.01)
  *G06F 3/0481* (2013.01)
  *G06F 17/30* (2006.01)

(56) References Cited

U.S. PATENT DOCUMENTS

| | | |
|---|---|---|
| 5,632,009 A | 5/1997 | Rao et al. |
| 5,632,987 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Joseph |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,546,245 B2 | 6/2009 | Surpin et al. |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,640,173 B2 | 12/2009 | Surpin et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,067 B2 | 5/2010 | Surpin et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,082,172 B2 | 12/2011 | Chao et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,494,984 B2 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,689,108 B1 | 4/2014 | Duffield et al. |
| 8,713,467 B1 | 4/2014 | Goldenberg et al. |

(56) References Cited

U.S. PATENT DOCUMENTS

| | | |
|---|---|---|
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,116,975 B2 | 8/2015 | Shankar et al. |
| 9,146,954 B1 | 9/2015 | Boe et al. |
| 9,202,249 B1 | 12/2015 | Cohen et al. |
| 9,223,773 B2 | 12/2015 | Isaacson |
| 9,229,952 B1 | 1/2016 | Meacham et al. |
| 9,250,759 B1 | 2/2016 | Commons |
| 9,256,664 B2 | 2/2016 | Chakerian et al. |
| 9,298,678 B2 | 3/2016 | Chakerian et al. |
| 9,319,288 B2 | 4/2016 | Somaiya et al. |
| 9,367,872 B1 | 6/2016 | Visbal et al. |
| 9,626,088 B2 | 4/2017 | Ma et al. |
| 9,646,396 B2 | 5/2017 | Sharma et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0172014 A1 | 9/2003 | Quackenbush et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0149596 A1 | 7/2006 | Surpin et al. |
| 2006/0184889 A1 | 8/2006 | Molander |
| 2006/0203337 A1 | 9/2006 | White |
| 2006/0209085 A1 | 9/2006 | Wong et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous et al. |
| 2007/0240062 A1 | 10/2007 | Christena et al. |
| 2007/0250784 A1 | 10/2007 | Riley |
| 2007/0266336 A1 | 11/2007 | Nojima et al. |
| 2007/0294200 A1 | 12/2007 | Au |
| 2007/0294643 A1 | 12/2007 | Kyle |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |

(56) References Cited

U.S. PATENT DOCUMENTS

| | | |
|---|---|---|
| 2008/0276167 A1 | 11/2008 | Michael |
| 2008/0278311 A1 | 11/2008 | Grange et al. |
| 2008/0281819 A1 | 11/2008 | Tenenbaum |
| 2008/0288306 A1 | 11/2008 | MacIntyre et al. |
| 2008/0288475 A1 | 11/2008 | Kim et al. |
| 2008/0294994 A1 | 11/2008 | Kruger et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0070162 A1 | 3/2009 | Leonelli |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0107196 A1 | 5/2011 | Foster |
| 2011/0113348 A1 | 5/2011 | Twiss et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161137 A1 | 6/2011 | Ubalde et al. |
| 2011/0167105 A1 | 7/2011 | Ramakrishnan et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0181598 A1 | 7/2011 | O'Neall et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0252351 A1 | 10/2011 | Sikora et al. |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004904 A1 | 1/2012 | Shin et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0116828 A1 | 5/2012 | Shannon |
| 2012/0117082 A1 | 5/2012 | Koperda et al. |
| 2012/0131139 A1* | 5/2012 | Siripurapu ............ H04L 65/60 709/217 |
| 2012/0131512 A1 | 5/2012 | Takeuchi et al. |
| 2012/0137235 A1 | 5/2012 | T S et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |

(56) References Cited

U.S. PATENT DOCUMENTS

| | | |
|---|---|---|
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0101159 A1 | 4/2013 | Chao et al. |
| 2013/0106860 A1 | 5/2013 | De Pauw et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0166550 A1 | 6/2013 | Buchmann et al. |
| 2013/0169666 A1 | 7/2013 | Pacheco et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276000 A1 | 10/2013 | Neeman |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0335419 A1 | 12/2013 | Bondesen et al. |
| 2014/0006938 A1 | 1/2014 | Black et al. |
| 2014/0019461 A1 | 1/2014 | Bredenberg et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0046934 A1 | 2/2014 | Zhou et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0059498 A1 | 2/2014 | McCormack et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0282177 A1 | 9/2014 | Wang et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2015/0019394 A1 | 1/2015 | Unser et al. |
| 2015/0046870 A1 | 2/2015 | Goldenberg et al. |
| 2015/0073929 A1 | 3/2015 | Psota et al. |
| 2015/0081370 A1 | 3/2015 | Lo et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134371 A1 | 5/2015 | Shivakumar et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178690 A1 | 6/2015 | May et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0213631 A1 | 7/2015 | Vander Broek |
| 2015/0227295 A1 | 8/2015 | Meiklejohn et al. |
| 2015/0227847 A1 | 8/2015 | Noel et al. |
| 2015/0229532 A1 | 8/2015 | Somaiya et al. |
| 2015/0229546 A1 | 8/2015 | Somaiya et al. |
| 2015/0242401 A1 | 8/2015 | Liu |
| 2015/0254878 A1 | 9/2015 | Sharma et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0341212 A1 | 11/2015 | Hsiao et al. |
| 2015/0347903 A1 | 12/2015 | Saxena et al. |
| 2015/0363478 A1 | 12/2015 | Haynes |
| 2015/0378996 A1 | 12/2015 | Kesin et al. |
| 2016/0004667 A1 | 1/2016 | Chakerian et al. |
| 2016/0006749 A1 | 1/2016 | Cohen et al. |
| 2016/0034545 A1 | 2/2016 | Shankar et al. |
| 2016/0098173 A1 | 4/2016 | Slawinski et al. |
| 2016/0162497 A1 | 6/2016 | Cho et al. |
| 2017/0109030 A1 | 4/2017 | Mingione |
| 2017/0109910 A1 | 4/2017 | Sharma et al. |
| 2017/0116294 A1 | 4/2017 | Ma et al. |

FOREIGN PATENT DOCUMENTS

| | | |
|---|---|---|
| DE | 102014215621 | 2/2015 |
| EP | 1191463 | 3/2002 |
| EP | 1672527 | 6/2006 |
| EP | 2551799 | 1/2013 |
| EP | 2560134 | 2/2013 |
| EP | 2778977 | 9/2014 |
| EP | 2778983 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |

(56) References Cited

FOREIGN PATENT DOCUMENTS

| | | |
|---|---|---|
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 02/065353 | 8/2002 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2013/010157 | 1/2013 |
| WO | WO 2013/102892 | 7/2013 |

OTHER PUBLICATIONS

Boyce, Jim, "Microsoft Outlook 2010 Inside Out," Aug. 1, 2010, retrieved from the internet https://capdtron.files.wordpress.com/2013/01/outlook-2010-inside_out.pdf.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," May 1, 2008, O'Reilly Media, Inc. pp. 93-97, 106-113, and 120-121.
Delcher et al., "Identifying Bacterial Genes and Endosymbiont DNA with Glimmer," BioInformatics, vol. 23, No. 6, 2007, pp. 673-679.
GIS-NET 3 Public_Department of Regional Planning. Planning & Zoning Information for Unincorporated LA County. Retrieved Oct. 2, 2013 from http://gis.planning.lacounty.gov/GIS-NET3_Public/Viewer.html.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Jelen, Bill, "Excel 2013 in Depth, Video Enhanced Edition," Jan. 25, 2013.
Kitts, Paul, "Chapter 14: Genome Assembly and Annotation Process," The NCBI Handbook, Oct. 2002, pp. 1-21.
Psaltis, Andrew G., "Streaming Data—Designing the Real-Time Pipeline," Jan. 16, 2015, vol. MEAP VO3, pp. 0-12.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Notice of Allowance for U.S. Appl. No. 14/225,084 dated May 4, 2015.
Notice of Allowance for U.S. Appl. No. 14/504,103 dated May 18, 2015.
Notice of Allowance for U.S. Appl. No. 14/570,914 dated Jan. 31, 2017.
Notice of Allowance for U.S. Appl. No. 14/616,080 dated Apr. 2, 2015.
Notice of Allowance for U.S. Appl. No. 14/923,364 dated May 6, 2016.
Official Communication for European Patent Application No. 14186225.0 dated Feb. 13, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 15166137.8 dated Sep. 14, 2015.
Official Communication for European Patent Application No. 16152984.7 dated Mar. 24, 2016.
Official Communication for Great Britain Application No. 1404457.2 dated Aug. 14, 2014.
Official Communication for Great Britain Patent Application No. 1404574.4 dated Dec. 18, 2014.
Official Communication for New Zealand Patent Application No. 628585 dated Aug. 26, 2014.
Official Communication for New Zealand Patent Application No. 627962 dated Aug. 5, 2014.
Official Communication for New Zealand Patent Application No. 628840 dated Aug. 28, 2014.
Official Communication for U.S. Appl. No. 14/135,289 dated Oct. 14, 2014.
Official Communication for U.S. Appl. No. 14/306,138 dated Sep. 14, 2015.
Official Communication for U.S. Appl. No. 14/306,138 dated Sep. 23, 2014.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Jun. 3, 2016.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/596,552 dated Dec. 23, 2016.
Official Communication for U.S. Appl. No. 15/397,562 dated Mar. 14, 2017.
"A First Look: Predicting Market Demand for Food Retail using a Huff Analysis," TRF Policy Solutions, Jul. 2012, pp. 30.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.

(56) References Cited

OTHER PUBLICATIONS

Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify" downloaded Jan. 22, 2015, 1 page.
Definition "Overlay" downloaded Jan. 22, 2015, 1 page.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
Rouse, Margaret, "OLAP Cube," http://searchdatamanagement.techtarget.com/definifion/OLAP-cube, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Umagandhi et al., "Search Query Recommendations Using Hybrid User Profile with Query Logs," International Journal of Computer Applications, vol. 80, No. 10, Oct. 1, 2013, pp. 7-18.
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues," 2001, pp. 859-864.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Notice of Allowance for U.S. Appl. No. 14/486,991 dated May 1, 2015.
Official Communication for New Zealand Patent Application No. 624557 dated May 14, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.

(56) References Cited

OTHER PUBLICATIONS

Official Communication for European Patent Application No. 14159464.8 dated Jul. 31, 2014.
Official Communication in New Zealand Patent Application No. 628495 dated Aug. 19, 2014.
Official Communication for Great Britain Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for European Patent Application No. 14180281.9 dated Jan. 26, 2015.
Official Communication for European Patent Application No. 14187996.5 dated Feb. 12, 2015.
Official Communication for European Patent Application No. 14180142.3 dated Feb. 6, 2015.
Official Communication for European Patent Application No. 14189344.6 dated Feb. 20, 2015.
Official Communication for Australian Patent Application No. 2014201511 dated Feb. 27, 2015.
Official Communication for European Patent Application No. 14189347.9 dated Mar. 4, 2015.
Official Communication for European Patent Application No. 14199182.8 dated Mar. 13, 2015.
Official Communication for Australian Patent Application No. 2014202442 dated Mar. 19, 2015.
Official Communication for European Patent Application No. 14180321.3 dated Apr. 17, 2015.
Official Communication for European Patent Application No. 14189802.3 dated May 11, 2015.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/319,765 dated Nov. 25, 2014.
Official Communication for U.S. Appl. No. 14/225,160 dated Oct. 22, 2014.
Official Communication for U.S. Appl. No. 14/504,103 dated Feb. 5, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/225,160 dated Feb. 11, 2015.
Official Communication for U.S. Appl. No. 14/306,138 dated Feb. 18, 2015.
Official Communication for U.S. Appl. No. 14/306,147 dated Feb. 19, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 13/831,791 dated Mar. 4, 2015.
Official Communication for U.S. Appl. No. 14/504,103 dated Mar. 31, 2015.
Official Communication for U.S. Appl. No. 13/247,987 dated Apr. 2, 2015.
Official Communication for U.S. Appl. No. 14/148,568 dated Mar. 26, 2015.
"A Word About Banks and the Laundering of Drug Money," Aug. 18, 2012, http://www.goiemxiv.co.uk/2012/08/a-word-about-banks-and-the-laundering-of-drug-money/.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"Using Whois Based Geolocation and Google Maps API for Support Cybercrime Investigations," http://wseas.us/e-library/conferences/2013/Dubrovnik/TELECIRC/TELECIRC-32.pdf.
Alur et al., "Chapter 2: IBM InfoSphere DataStage Stages," IBM InfoSphere DataStage Data Flow and Job Design, Jul. 1, 2008, pp. 35-137.
Celik, Tantek, "CSS Basic User Interface Module Level 3 (CSS3 UI)," Section 8 Resizing and Overflow, Jan. 17, 2012, retrieved from internet http://www.w3.org/TR/2012/WO-css3-ui-20120117-#resizing-amp-overflow retrieved on May 18, 2015.
Huang et al., "Systematic and Integrative Analysis of Large Gene Lists Using DAVID Bioinformatics Resources," Nature Protocols, 4.1, 2008, 44-57.
Map Builder, "Rapid Mashup Development Tool for Google and Yahoo Maps!" http://web.archive.org/web/20090626224734/http://www.mapbuilder.net/printed Jul. 20, 2012 in 2 pages.
Nolan et al., "MCARTA: A Malicious Code Automated Run-Time Analysis Framework," Homeland Security, 2012 IEEE Conference on Technologies for, Nov. 13, 2012, pp. 13-17.
Perdisci et al., "Behavioral Clustering of HTTP-Based Malware and Signature Generation Using Malicious Network Traces," USENIX, Mar. 18, 2010, pp. 1-14.
Quest, "Toad for Oracle 11.6—Guide to Using Toad," Sep. 24, 2012, pp. 1-162.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
International Search Report and Written Opinion in Application No. PCT/US2009/056703 dated Mar. 15, 2010.
Notice of Allowance for U.S. Appl. No. 12/556,318 dated Nov. 2, 2015.
Notice of Allowance for U.S. Appl. No. 14/320,236 dated Jun. 29, 2016.
Notice of Allowance for U.S. Appl. No. 14/596,552 dated Dec. 23, 2016.

(56) References Cited

OTHER PUBLICATIONS

Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Australian Patent Application No. 2014250678 dated Oct. 7, 2015.
Official Communication for European Patent Application No. 14180432.8 dated Jun. 23, 2015.
Official Communication for European Patent Application No. 14187739.9 dated Jul. 6, 2015.
Official Communication for European Patent Application No. 14191540.5 dated May 27, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for Netherlands Patent Application No. 2012437 dated Sep. 18, 2015.
Official Communication for Netherlands Patent Application No. 2013306 dated Apr. 24, 2015.
Official Communication for U.S. Appl. No. 12/556,318 dated Jul. 2, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/196,814 dated May 5, 2015.
Official Communication for U.S. Appl. No. 14/490,612 dated Aug. 18, 2015.
Official Communication for U.S. Appl. No. 14/570,914 dated Sep. 16, 2016.
Official Communication for U.S. Appl. No. 14/570,914 dated Dec. 19, 2016.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/596,552 dated Sep. 23, 2016.
Official Communication for U.S. Appl. No. 14/596,552 dated Oct. 5, 2016.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/726,353 dated Sep. 10, 2015.
Official Communication for U.S. Appl. No. 14/813,749 dated Sep. 28, 2015.
Official Communication for U.S. Appl. No. 14/874,690 dated Jun. 1, 2016.
Restriction Requirement for U.S. Appl. No. 13/839,026 dated Apr. 2, 2015.
About 80 Minutes, "Palantir in a Number of Parts—Part 6—Graph," Mar. 21, 2013, pp. 1-6, retrieved from the internet http://about80minutes.blogspot.nl/2013/03/palantir=in-number-of-parts-part-6-graph.html retrieved on Aug. 18, 2015.
Alfred, Rayner "Summarizing Relational Data Using Semi-Supervised Genetic Algorithm-Based Clustering Techniques", Journal of Computer Science, 2010, vol. 6, No. 7, pp. 775-784.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Palantir Technolgies, "Palantir Labs—Timeline," Oct. 1, 2010, retrieved from the internet https://www.youtube.com/watch?v=JCgDW5bru9M retrieved on Aug. 19, 2015.
Vose et al., "Help File for ModelRisk Version 5," 2007, Vose Software, pp. 349-353. [Uploaded in 2 Parts].
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Notice of Allowance for U.S. Appl. No. 13/247,987 dated Mar. 17, 2016.
Notice of Allowance for U.S. Appl. No. 14/148,568 dated Aug. 26, 2015.
Notice of Allowance for U.S. Appl. No. 14/192,767 dated Apr. 20, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Feb. 27, 2015.
Official Communication for European Patent Application No. 14189344.6 dated Feb. 29, 2016.
Official Communication for European Patent Application No. 14197938.5 dated Apr. 28, 2015.
Official Communication for European Patent Application No. 15165244.3 dated Aug. 27, 2015.
Official Communication for U.S. Appl. No. 13/247,987 dated Sep. 22, 2015.
Official Communication for U.S. Appl. No. 13/831,791 dated Feb. 11, 2016.
Official Communication for U.S. Appl. No. 13/831,791 dated Aug. 6, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/148,568 dated Mar. 27, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/225,006 dated Sep. 2, 2015.

(56) References Cited

OTHER PUBLICATIONS

Official Communication for U.S. Appl. No. 14/225,006 dated Dec. 21, 2015.
Official Communication for U.S. Appl. No. 14/225,084 dated Sep. 11, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Jan. 25, 2016.
Official Communication for U.S. Appl. No. 14/268,964 dated Jul. 11, 2014.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/306,138 dated Mar. 17, 2016.
Official Communication for U.S. Appl. No. 14/306,138 dated Dec. 24, 2015.
Official Communication for U.S. Appl. No. 14/306,147 dated Dec. 24, 2015.
Official Communication for U.S. Appl. No. 14/306,154 dated Feb. 1, 2016.
Official Communication for U.S. Appl. No. 14/306,154 dated Mar. 17, 2016.
Official Communication for U.S. Appl. No. 14/319,765 dated Feb. 1, 2016.
Official Communication for U.S. Appl. No. 14/473,860 dated Nov. 4, 2014.
Official Communication for U.S. Appl. No. 14/645,304 dated Jan. 25, 2016.
Official Communication for U.S. Appl. No. 14/874,690 dated Dec. 21, 2015.
Official Communication for U.S. Appl. No. 14/948,009 dated Feb. 25, 2016.
Ocull, Heather, "Timelines Everywhere: See and share your work with ease in SharePoint and PWA," Office Blogs, published Sep. 7, 2012, in 8 pages.
Notice of Allowance for U.S. Appl. No. 14/948,009 dated May 6, 2016.
Notice of Allowance for U.S. Appl. No. 15/092,456 dated Jul. 14, 2017.
Notice of Allowance for U.S. Appl. No. 15/392,624 dated Jun. 1, 2017.
Official Communication for European Patent Application No. 15155846.7 dated May 19, 2016.
Official Communication for U.S. Appl. No. 14/148,559 dated Jun. 16, 2014.
Official Communication for U.S. Appl. No. 14/148,559 dated Apr. 2, 2014.
Official Communication for U.S. Appl. No. 15/092,456 dated Nov. 4, 2016.
Official Communication for U.S. Appl. No. 15/392,624 dated Mar. 10, 2017.
Official Communication for U.S. Appl. No. 15/397,562 dated May 24, 2017.

* cited by examiner

SYSTEMS AND USER INTERFACES FOR DYNAMIC AND INTERACTIVE ACCESS OF, INVESTIGATION OF, AND ANALYSIS OF DATA OBJECTS STORED IN ONE OR MORE DATABASES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application No. 61/985,403, filed Apr. 28, 2014, and titled "TIME-BASED DISPLAY OF DATA OBJECTS." The entire disclosure of each of the above items is hereby made part of this specification as if set forth fully herein and incorporated by reference for all purposes, for all that it contains.

BACKGROUND

Embodiments of the present disclosure relate to systems and techniques for time-based display of data objects.

An example of a time-based display of data objects is a timeline. A timeline is a way of displaying a list of events in chronological order. A timeline is typically a graphic design showing a long bar labeled with dates or times alongside itself and usually events labeled on points where they would have happened.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a system that may enable efficient analysis of data objects. In particular, the system provides a time-based visualization of data objects (and/or properties associated with the data objects) to a user such that the user may, for example, determine connections between various data objects, observe flows of information among data objects, and/or investigate related data objects.

For example, the system described herein may show various data objects as graphical icons in a display area, and may indicate relationships among those data objects with graphical lines or links between the graphical icons. Further, there may be time-based properties associated with the data objects. These time-based properties may not be apparent in the display area, but may be made more clear in a time-based display. The time-based display may indicate time-dependent relationships among the various data objects. For example, the data objects may be represented by bars and/or lines along a timeline, and may be grouped together into bins corresponding to various periods of time.

The system enables a user to efficiently understand time-based relationships among the data objects, as the data objects may be simultaneously displayed with graphical links in one portion of the display, and in a time-based display in another portion. Interactions with the data objects in either portion of the display may cause corresponding indications and/or updates in another portion. For example, selection of particular data objects in the time-based portion of the display may cause the corresponding data objects as represented by graphical icons to be highlighted. Similarly, selection of graphical icons representing data objects may cause a corresponding highlighting and/or other adjustment to the time-based display. Additionally, the graphical icons may be highlighted in an animated fashion based on time-based properties associated with the corresponding data objects, enabling a user to efficiently determine a sequence of events associated with related data items.

According to an embodiment, a computer system is disclosed comprising one or more computer readable storage devices configured to store: a plurality of computer executable instructions; and a plurality of data objects, each of the data objects associated with one or more properties; and one or more hardware computer processors in communication with the one or more computer readable storage devices and configured to execute the plurality of computer executable instructions in order to cause the computer system to: access one or more data objects from the one or more computer readable storage devices; determine one or more relationships among the one or more data objects based on the one or more properties associated with respective of the one or more data objects; generate a data object display panel including one or more data objects in a graph layout, the graph layout including indications of the one or more relationships; determine a time-based property associated with each of at least some of the one or more data objects; generate a time-based display panel including representations of each of the at least some of the one or more data objects; display the data object display panel and the time-based display panel on an electronic display of the computer system; determine a window of time associated with the time-based display panel; and in response to receiving an input indicating a selection of a play indicator: move the window of time along the time-based display panel in an animated fashion; and highlight, in the data object display panel, data objects corresponding to the location of the window of time as it moves along the time-based display panel.

According to an aspect, the window of time is determined based on at least one of: a percentage of time represented in the time-based display panel, a percentage of the one or more data objects represented in the time-based display panel, a number of data objects represented in the time-based display panel, or an amount of time represented in the time-based display panel.

According to another aspect, the user may adjust the speed at which the window of time moves along the time-based display panel.

According to yet another aspect, highlighting the data objects comprises greying out any data objects not corresponding to the location of the window of time.

According to another aspect, the time-based display panel includes information bins in which the one or more data objects are placed.

According to yet another aspect, the information bins comprise at least one of bars or points along a line.

According to yet another aspect, in response to an input indicating a selection of one or more of the bars or the points along the line, highlighting corresponding data objects in the data object display panel.

According to another aspect, the data object display panel and the time-based display panel are simultaneously displayed on the electronic display of the computer system.

According to yet another aspect, the time-based display panel comprises a timeline.

According to another aspect, the graph layout comprises graphical icons representing each of the one or more data objects, and wherein the indications of the one or more relationships comprise graphical lines connecting respective graphical icons representing related data objects.

According to another embodiment, a computer system is disclosed comprising: one or more computer readable storage devices configured to store: a plurality of computer executable instructions; and a plurality of data objects, each of the data objects associated with one or more properties; and one or more hardware computer processors in communication with the one or more computer readable storage devices and configured to execute the plurality of computer executable instructions in order to cause the computer system to: access one or more data objects from the one or more computer readable storage devices; generate a data object display panel including one or more data objects; determine a time-based property associated with each of at least some of the one or more data objects; generate a time-based display panel including representations of each of the at least some of the one or more data objects; display the data object display panel and the time-based display panel on an electronic display of the computer system; determine a window of time associated with the time-based display panel; and in response to receiving an input indicating a selection of a play indicator: move the window of time along the time-based display panel in an animated fashion; and highlight, in the data object display panel, data objects corresponding to the location of the window of time as it moves along the time-based display panel.

According to an aspect, the window of time is determined based on at least one of: a percentage of time represented in the time-based display panel, a percentage of the one or more data objects represented in the time-based display panel, a number of data objects represented in the time-based display panel, or an amount of time represented in the time-based display panel.

According to another aspect, the user may adjust the speed at which the window of time moves along the time-based display panel.

According to yet another aspect, highlighting the data objects comprises greying out any data objects not corresponding to the location of the window of time.

According to another aspect, the time-based display panel includes information bins in which the one or more data objects are placed.

According to yet another aspect, the information bins comprise at least one of bars or points along a line.

According to yet another aspect, in response to an input indicating a selection of one or more of the bars or the points along the line, highlighting corresponding data objects in the data object display panel.

According to another aspect, the data object display panel and the time-based display panel are simultaneously displayed on the electronic display of the computer system.

According to yet another aspect, the time-based display panel comprises a timeline.

According to another aspect, the one or more hardware computer processors are configured to execute the plurality of computer executable instructions in order to further cause the computer system to: determine one or more relationships among the one or more data objects based on the one or more properties associated with respective of the one or more data objects, wherein the data object display panel includes the one or more data objects in a graph layout, the graph layout including indications of the one or more relationships.

According to yet another aspect, the graph layout comprises graphical icons representing each of the one or more data objects, and wherein the indications of the one or more relationships comprise graphical lines connecting respective graphical icons representing related data objects.

According to another aspect, the data object display panel includes the one or more data objects in at least one of a histogram, a table, a list, or a map.

In various embodiments, computer-implemented methods are disclosed in which, under control of one or more hardware computing devices configured with specific computer executable instructions, one or more aspects of the above-described embodiments are implemented and/or performed.

In various embodiments, a non-transitory computer-readable storage medium storing software instructions is disclosed that, in response to execution by a computer system having one or more hardware processors, configure the computer system to perform operations comprising one or more aspects of the above-described embodiments.

Further, as described herein, a system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of relevant data objects and/or properties), automatic and dynamic execution of complex processes in response to the input delivery (for example, identifying related data objects and highlighting corresponding data objects in various views), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective user interface for an investigation of data objects of various types. An analyst may be able to investigate a group of related data objects instead of an individual data object, and may be able to determine time-based relationships among the data objects that may not otherwise be apparent.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION OF SPECIFIC EMBODIMENTS

Overview

Figure 1A:
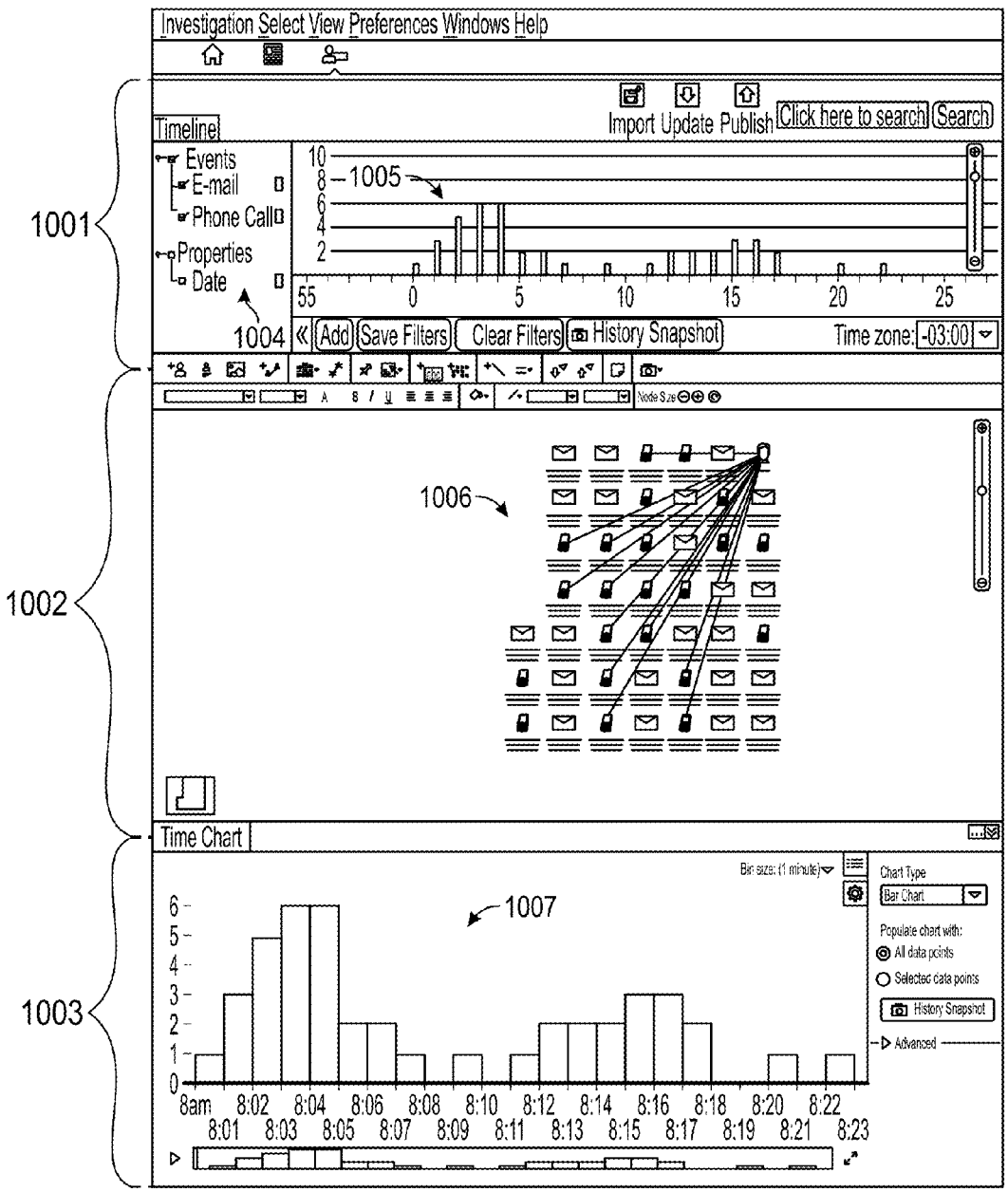
FIGS. 1A-1Q illustrate example embodiments of user interfaces, and functionality associated with the example user interfaces, of a system including time-based displays of data objects.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

As mentioned above, various embodiments of an interactive time-based display of data objects (referred to herein as a "Time Chart") are disclosed. The Time Chart provides a time-based visualization of data objects (and/or properties associated with the data objects) to a user such that the user may, for example, determine connections between various data objects, observe flows of information among data objects, and/or investigate related data objects.

For example, the system described herein may show various data objects as graphical icons in a display area, and may indicate relationships among those data objects with graphical lines or links between the graphical icons. Further, there may be time-based properties associated with the data objects. These time-based properties may not be apparent in the display area, but may be made more clear in a time-based display. The time-based display may indicate time-dependent relationships among the various data objects. For example, the data objects may be represented by bars and/or lines along a timeline, and may be grouped together into bins corresponding to various periods of time.

The system enables a user to efficiently understand time-based relationships among the data objects, as the data objects may be simultaneously displayed with graphical links in one portion of the display, and in a time-based display in another portion. Interactions with the data objects in either portion of the display may cause corresponding indications and/or updates in another portion. For example, selection of particular data objects in the time-based portion of the display may cause the corresponding data objects as represented by graphical icons to be highlighted. Similarly, selection of graphical icons representing data objects may cause a corresponding highlighting and/or other adjustment to the time-based display. Additionally, the graphical icons may be highlighted in an animated fashion based on time-based properties associated with the corresponding data objects, enabling a user to efficiently determine a sequence of events associated with related data items.

Figure 1B:
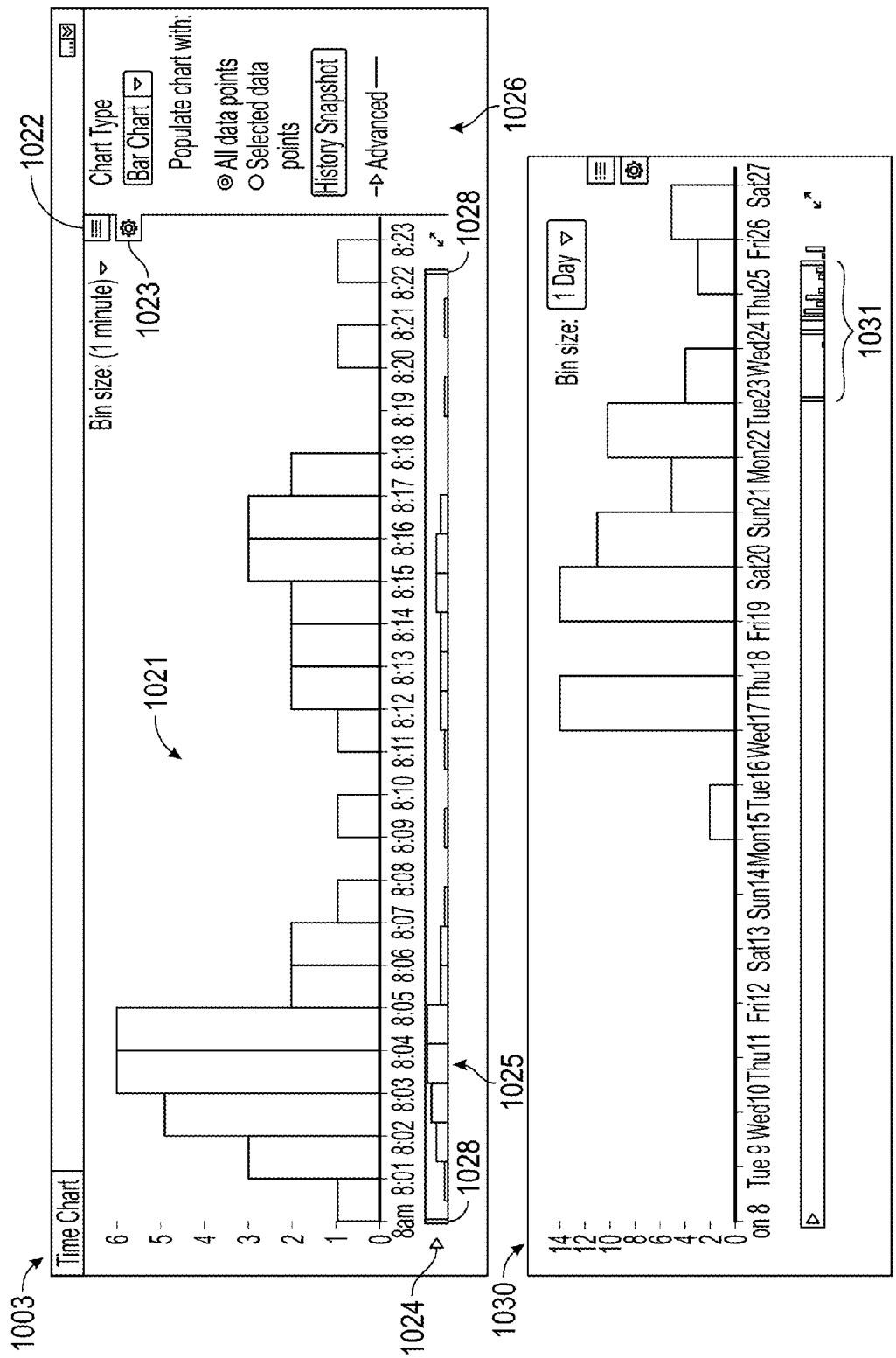
Figure 1C:
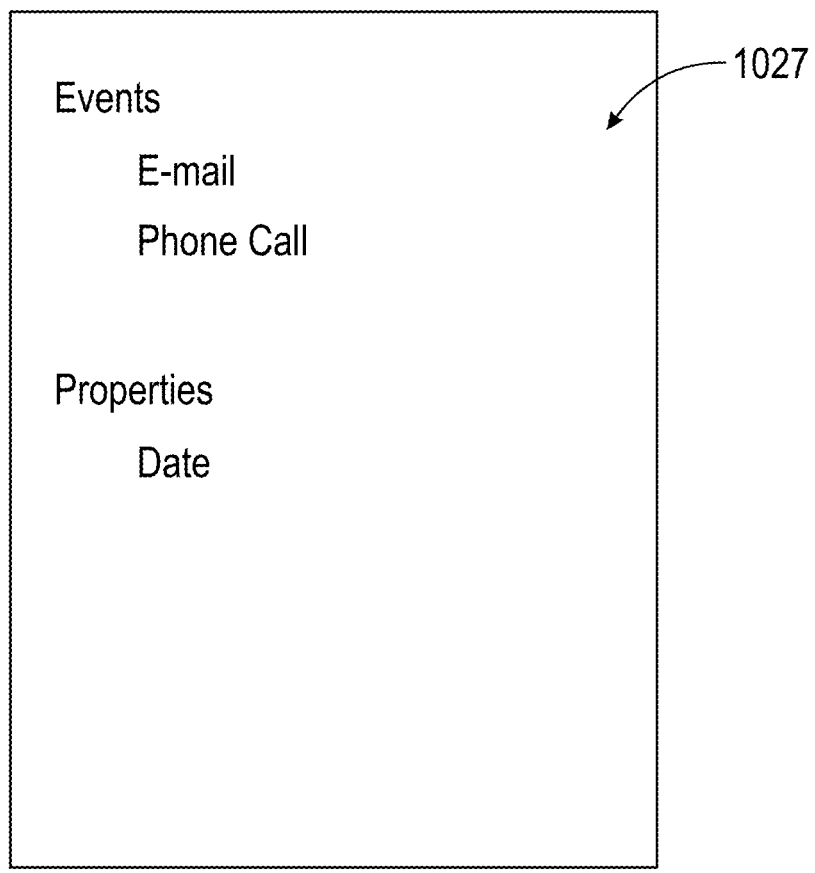
Figure 1D:
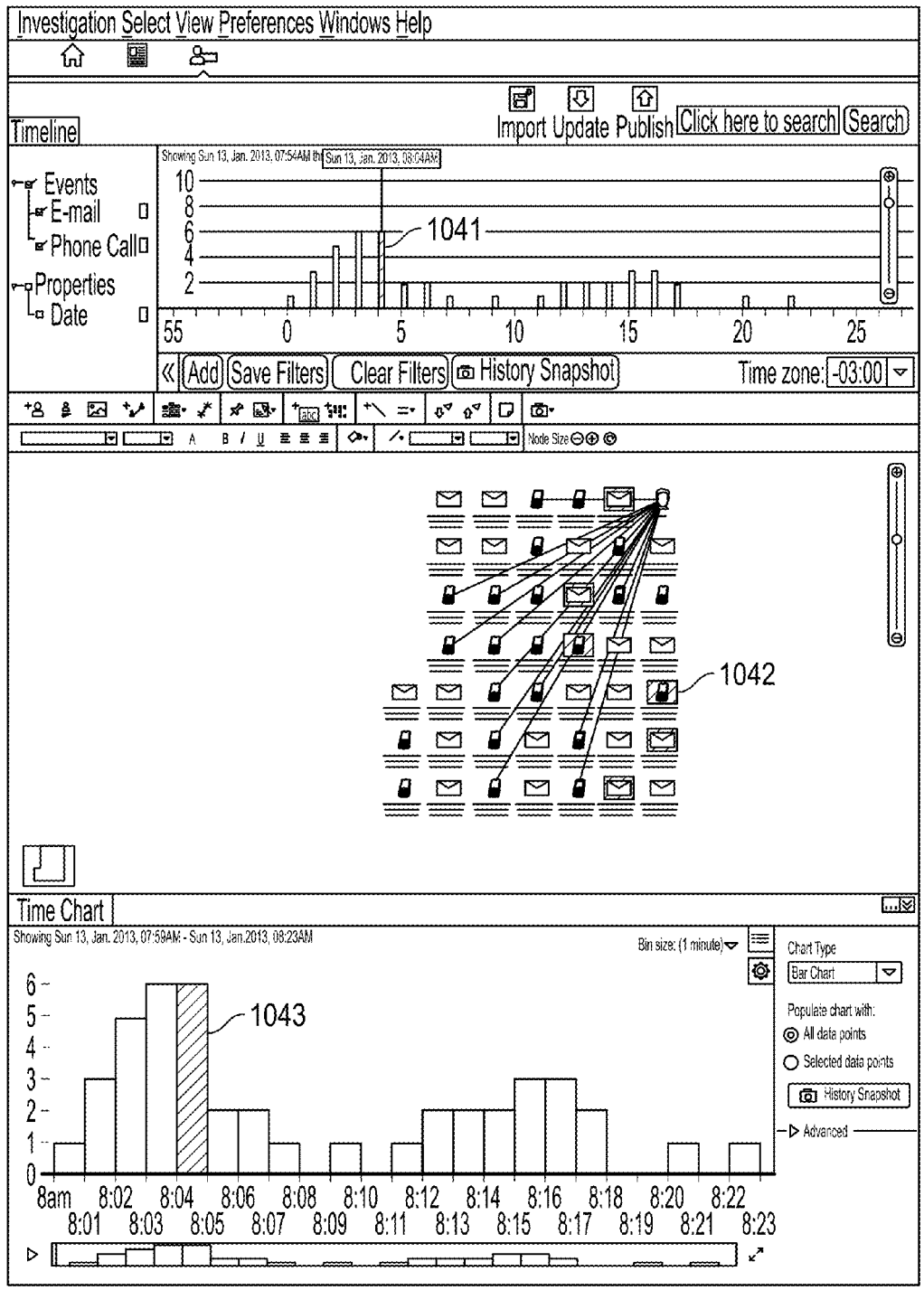
Figure 1E:
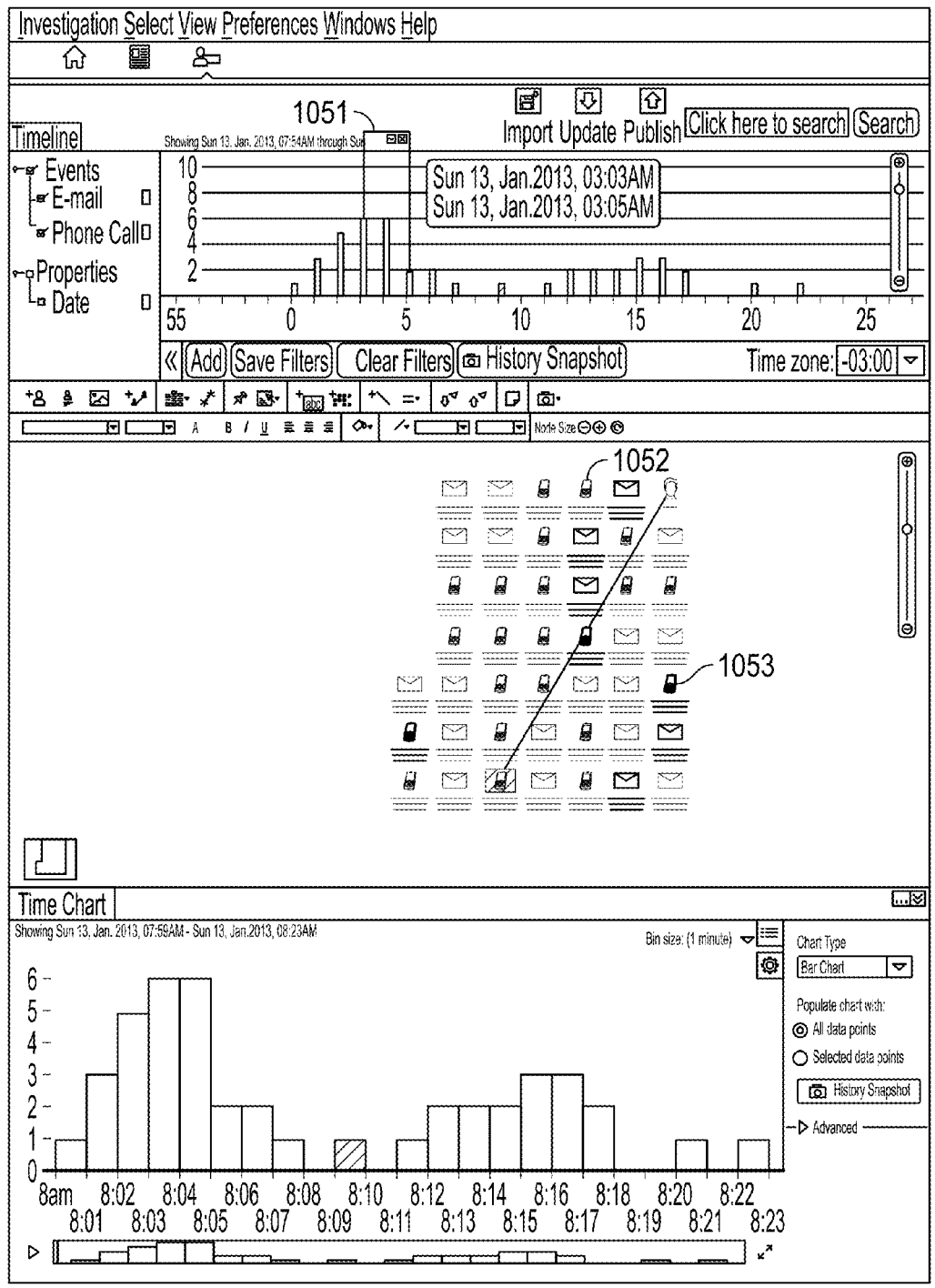
Figure 1F:
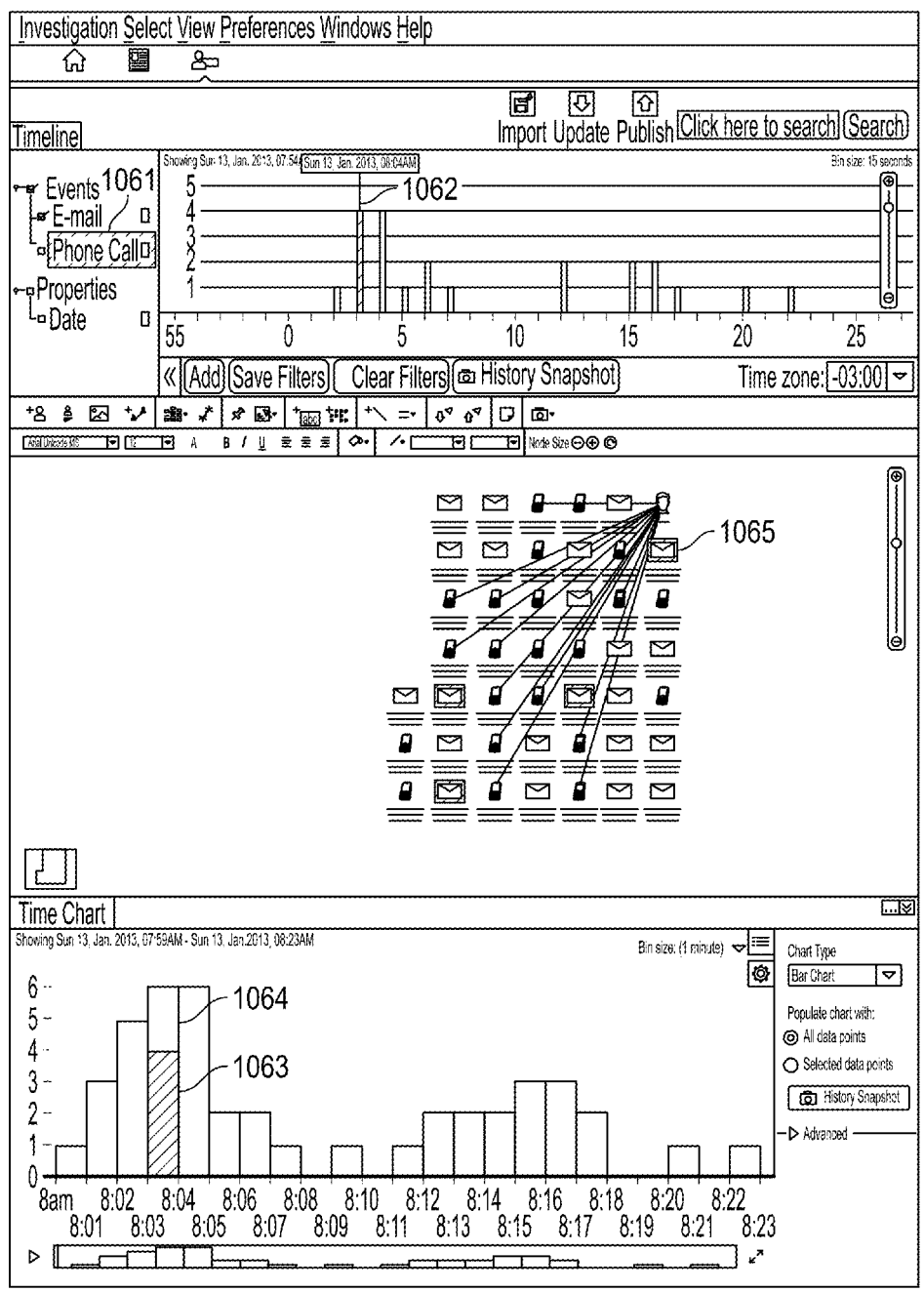
Figure 1G:
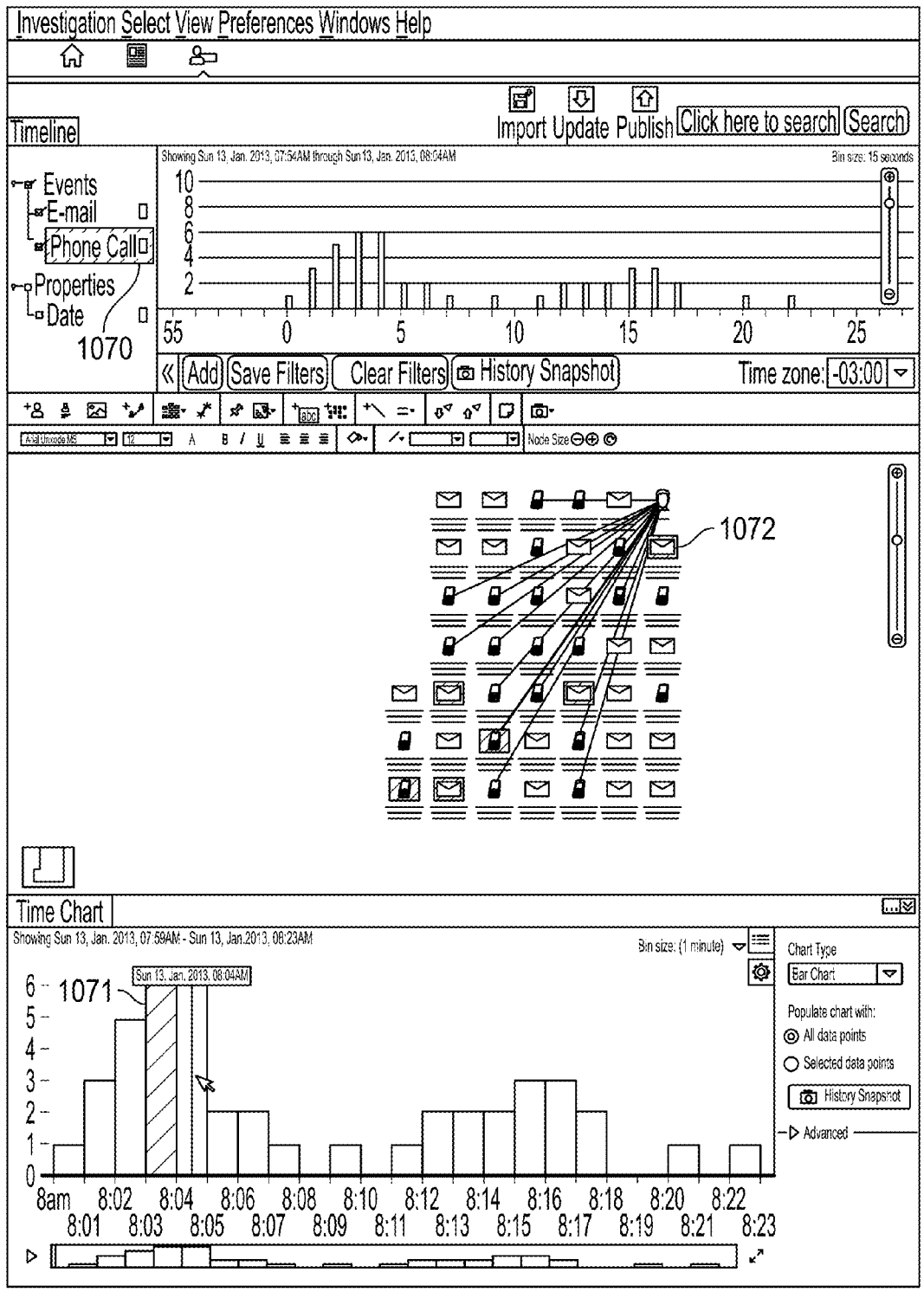
Figure 1H:
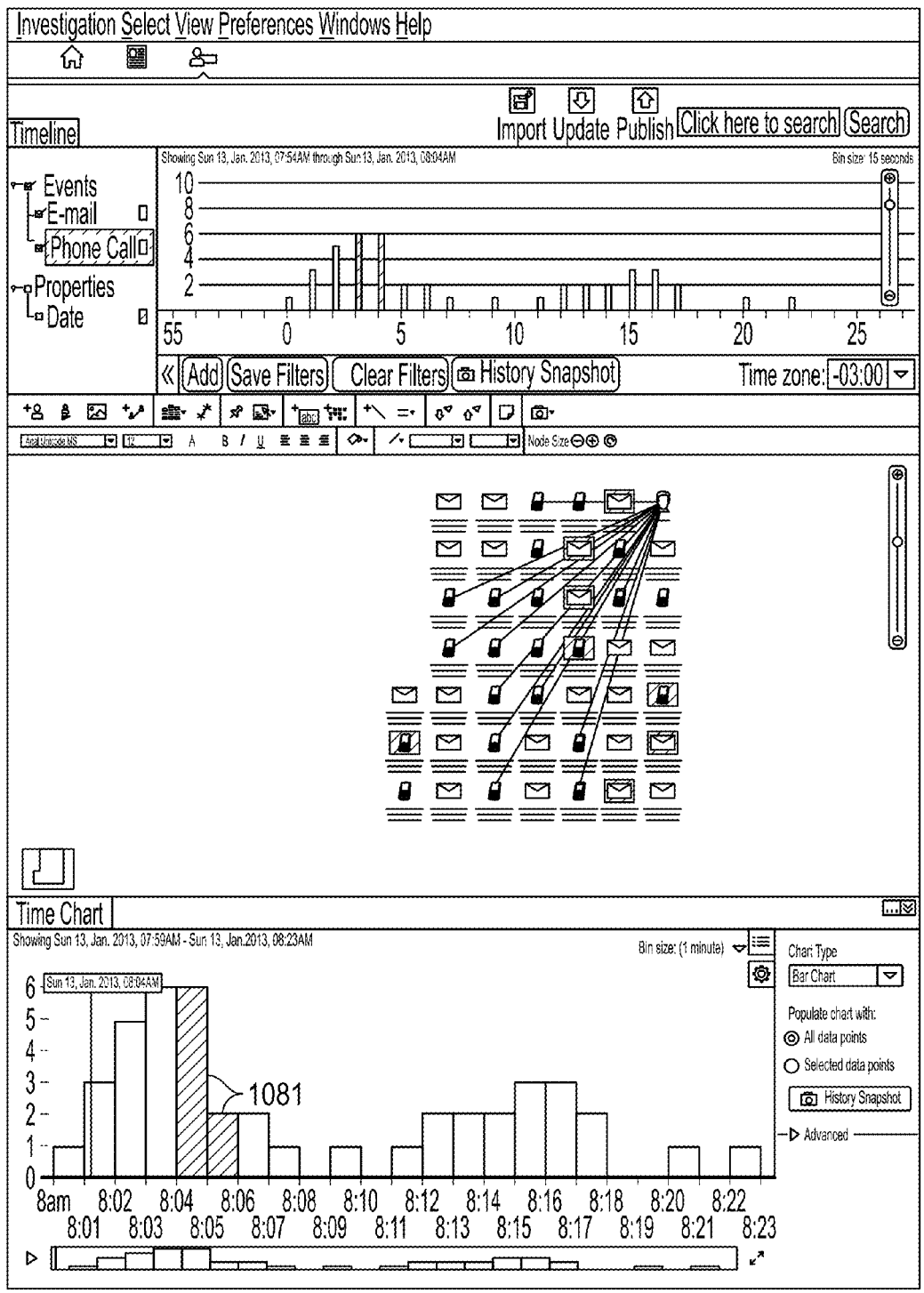
Figure 1I:
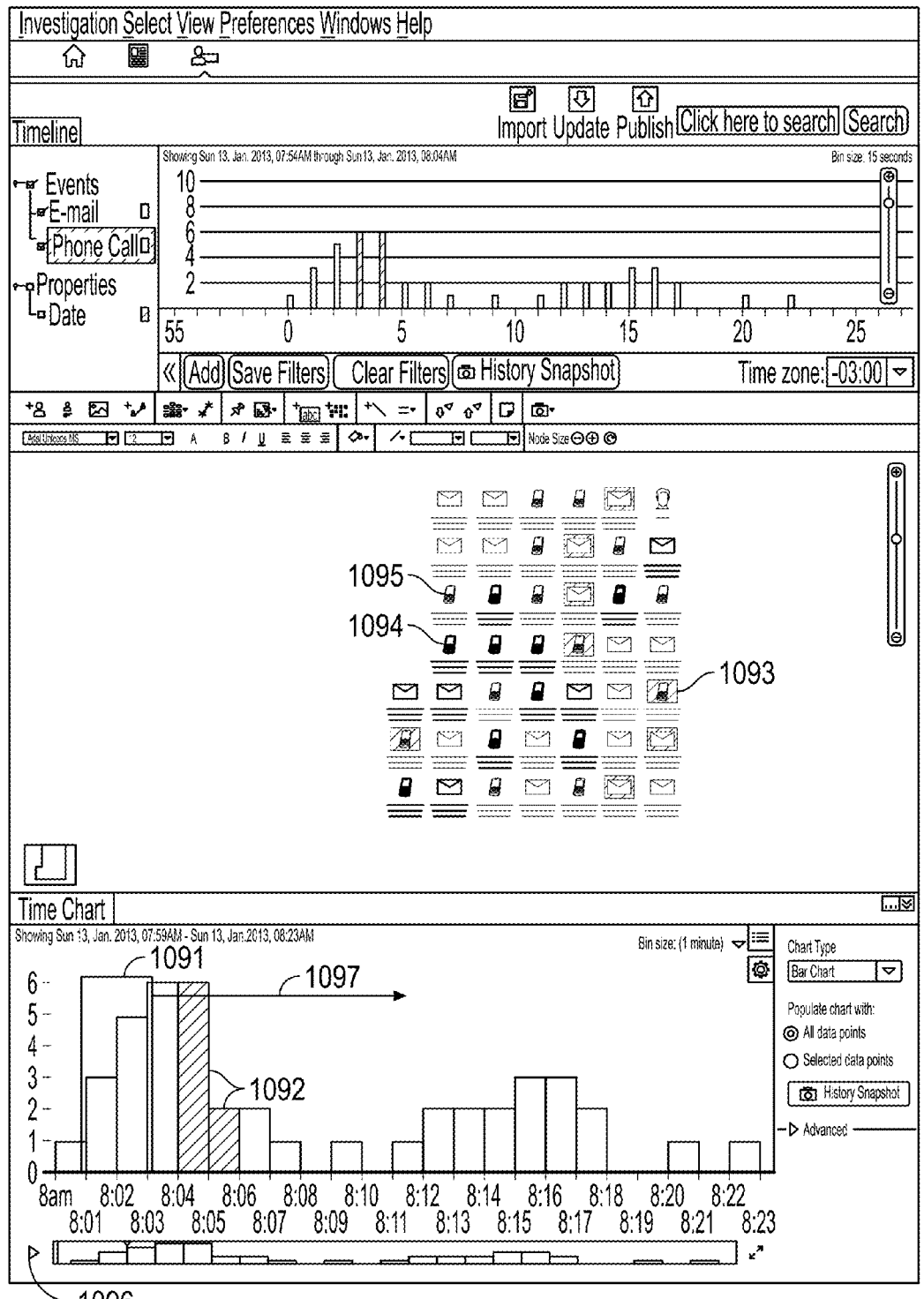
Figure 1J:
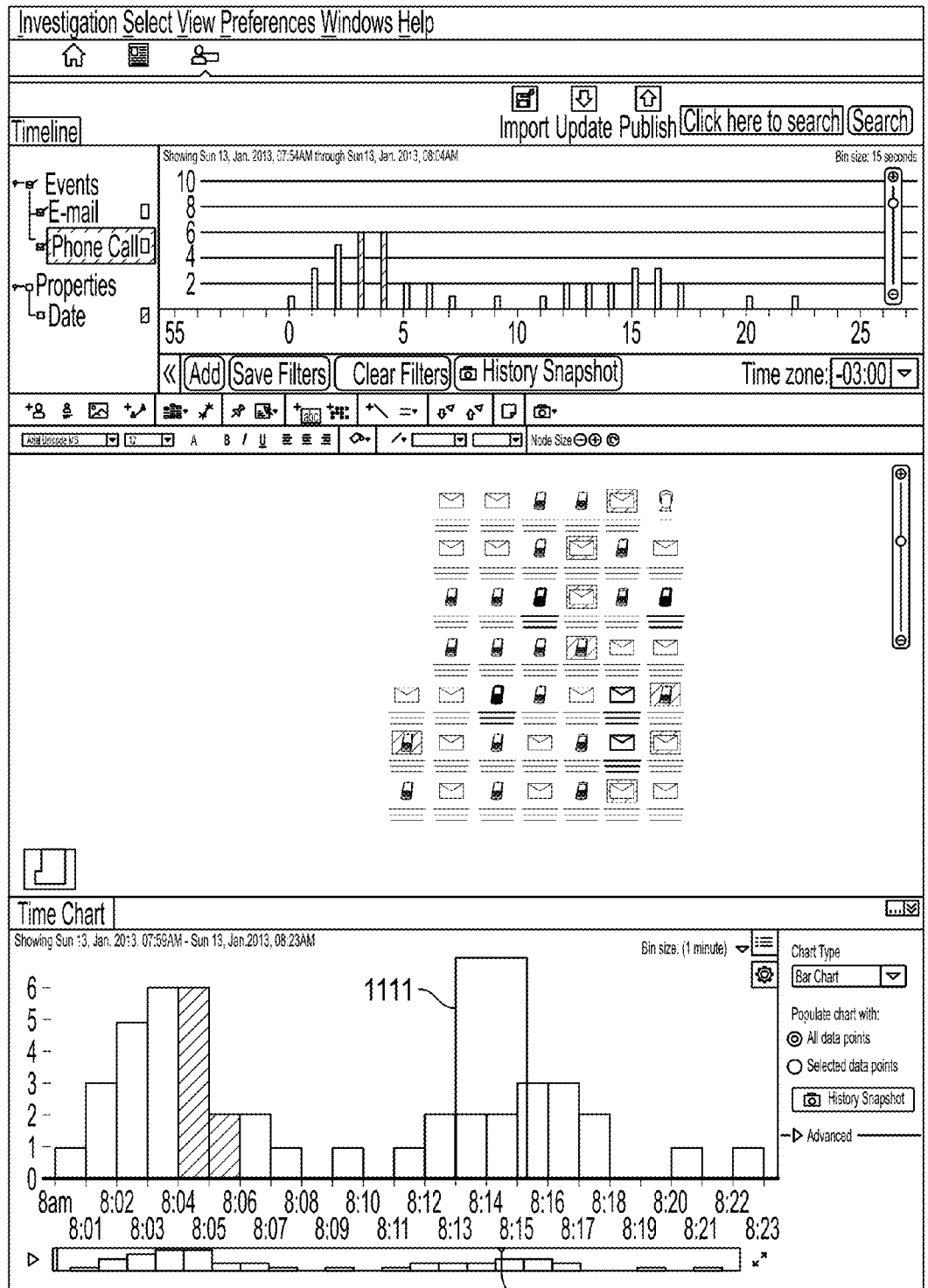
Figure 1K:
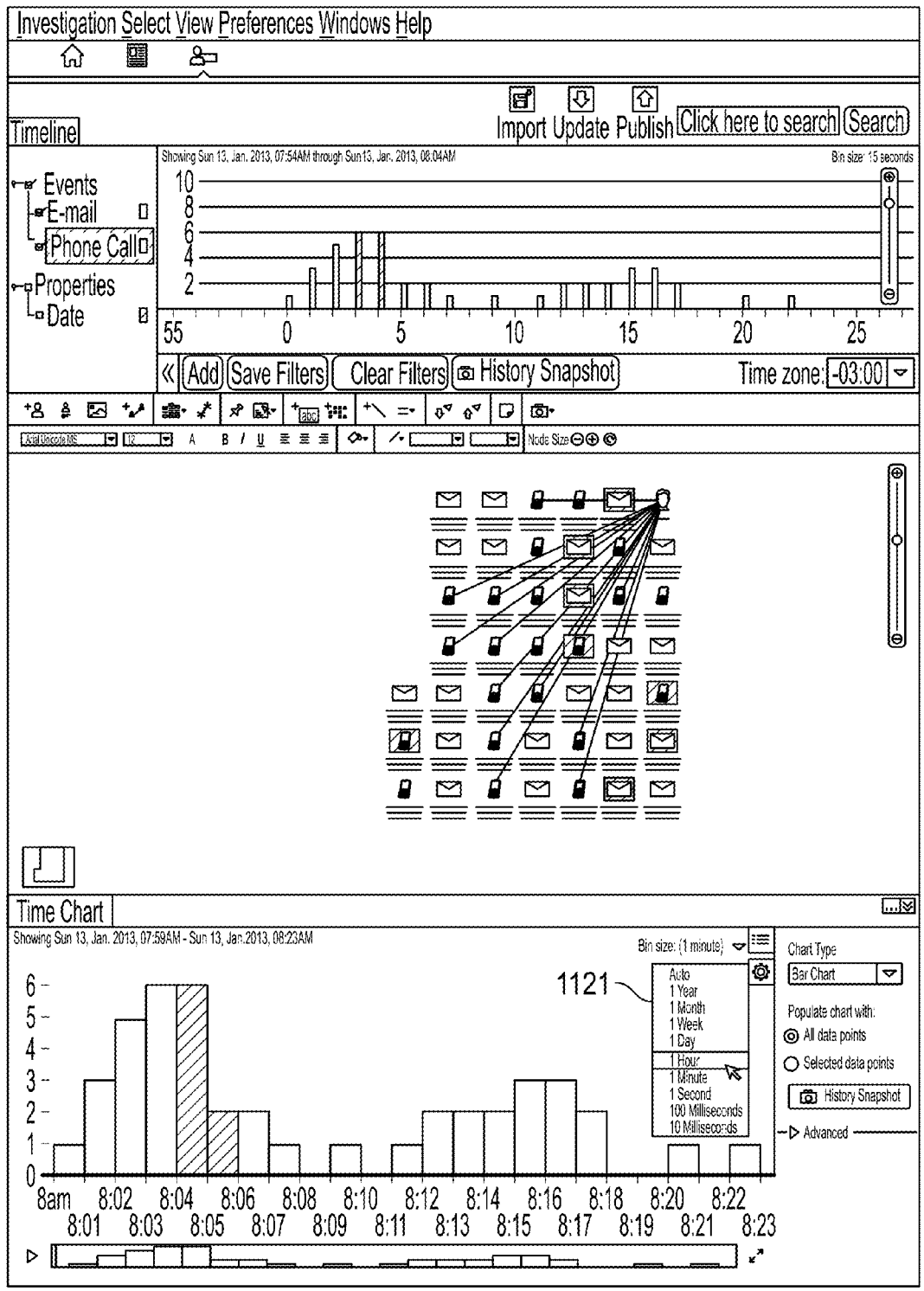
Figure 1L:
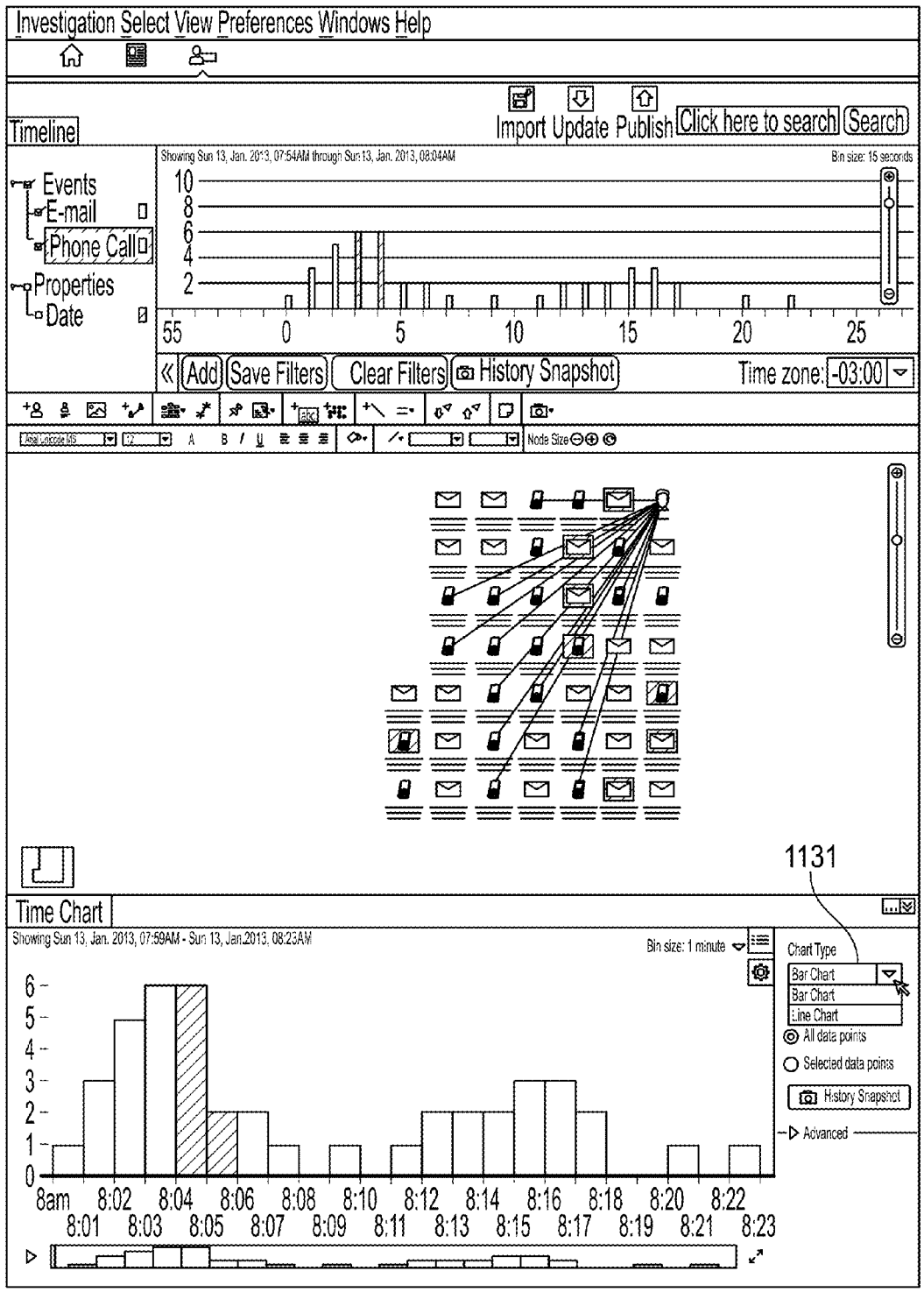
Figure 1M:
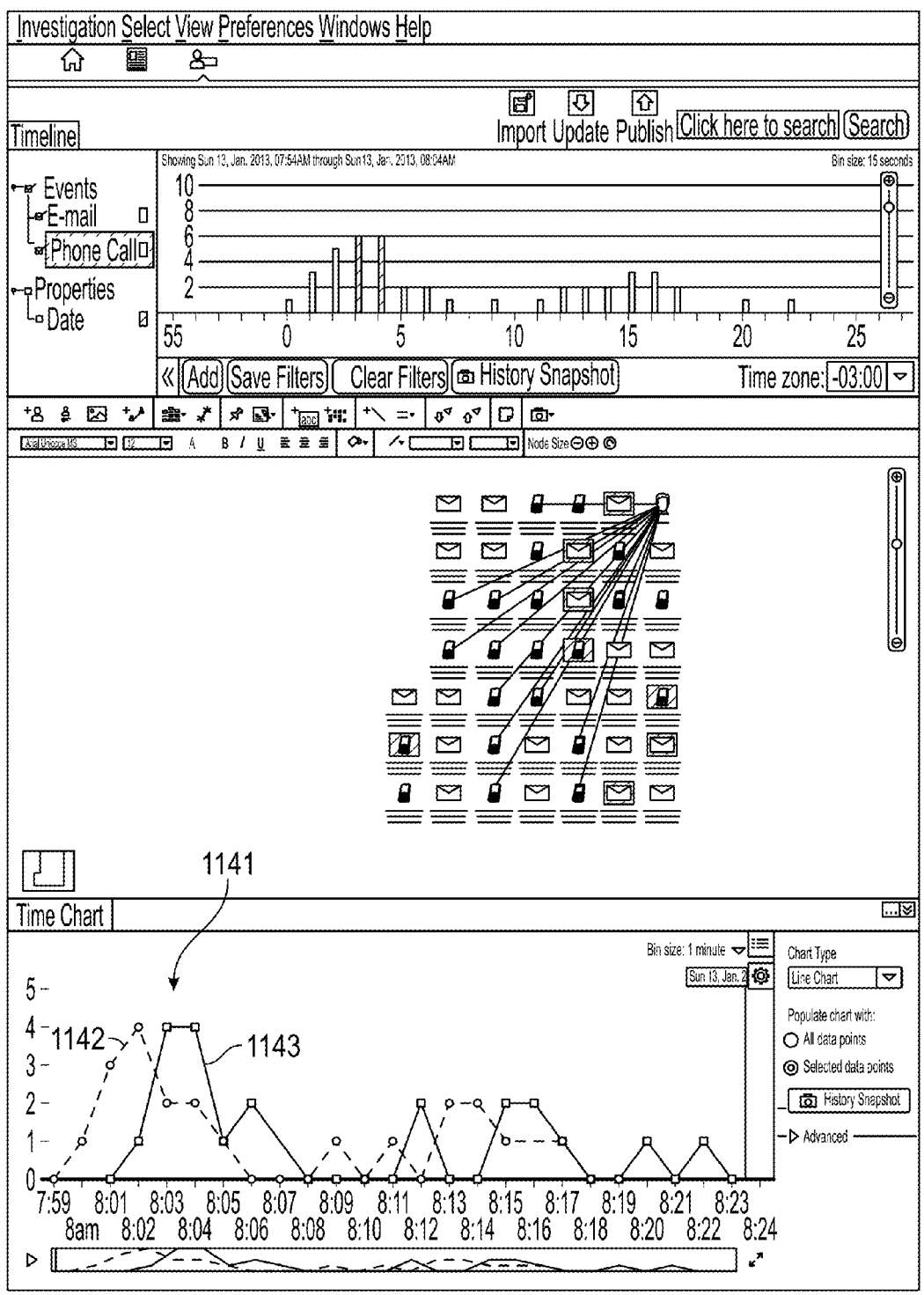
Figure 1N:
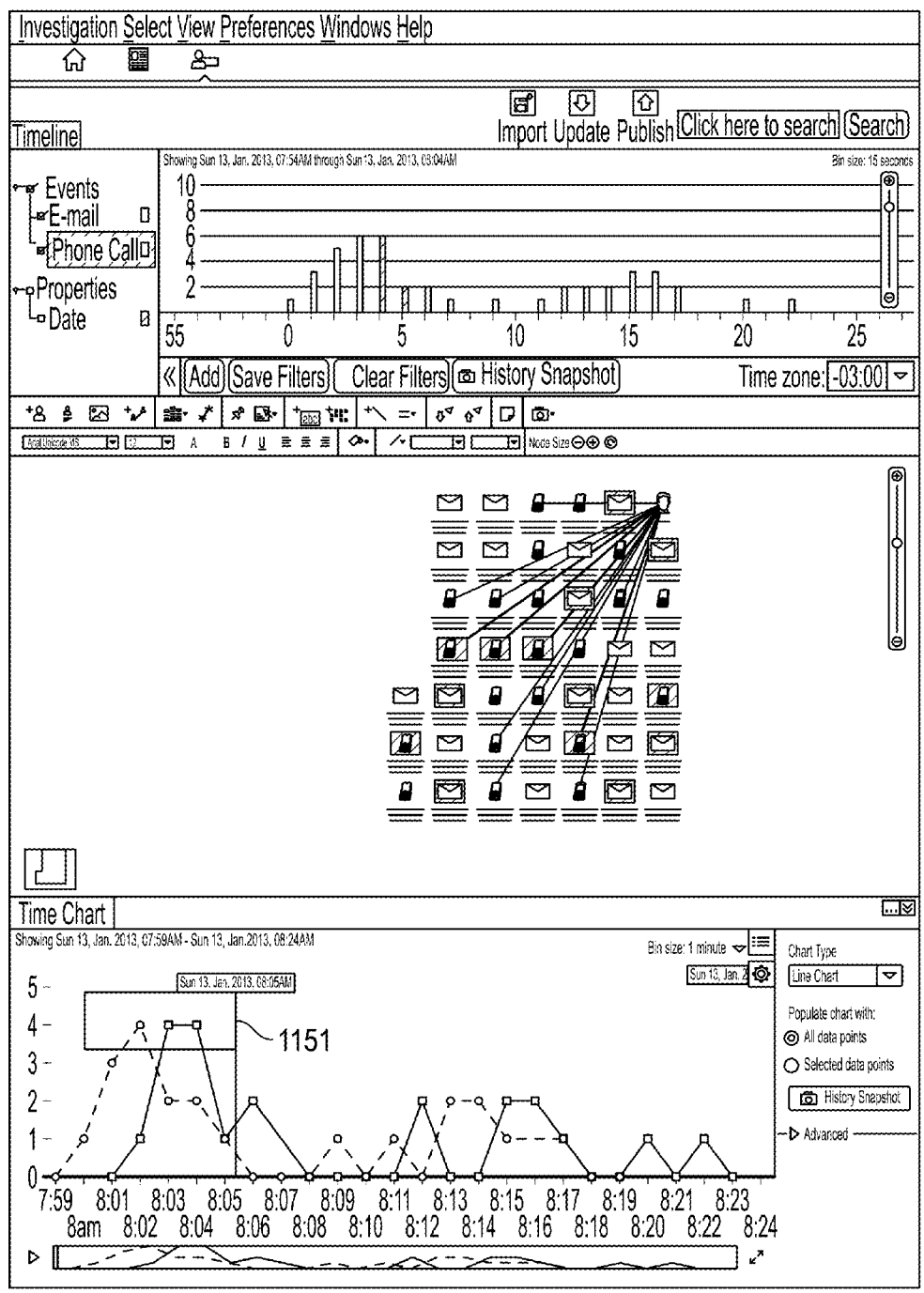
Figure 10:
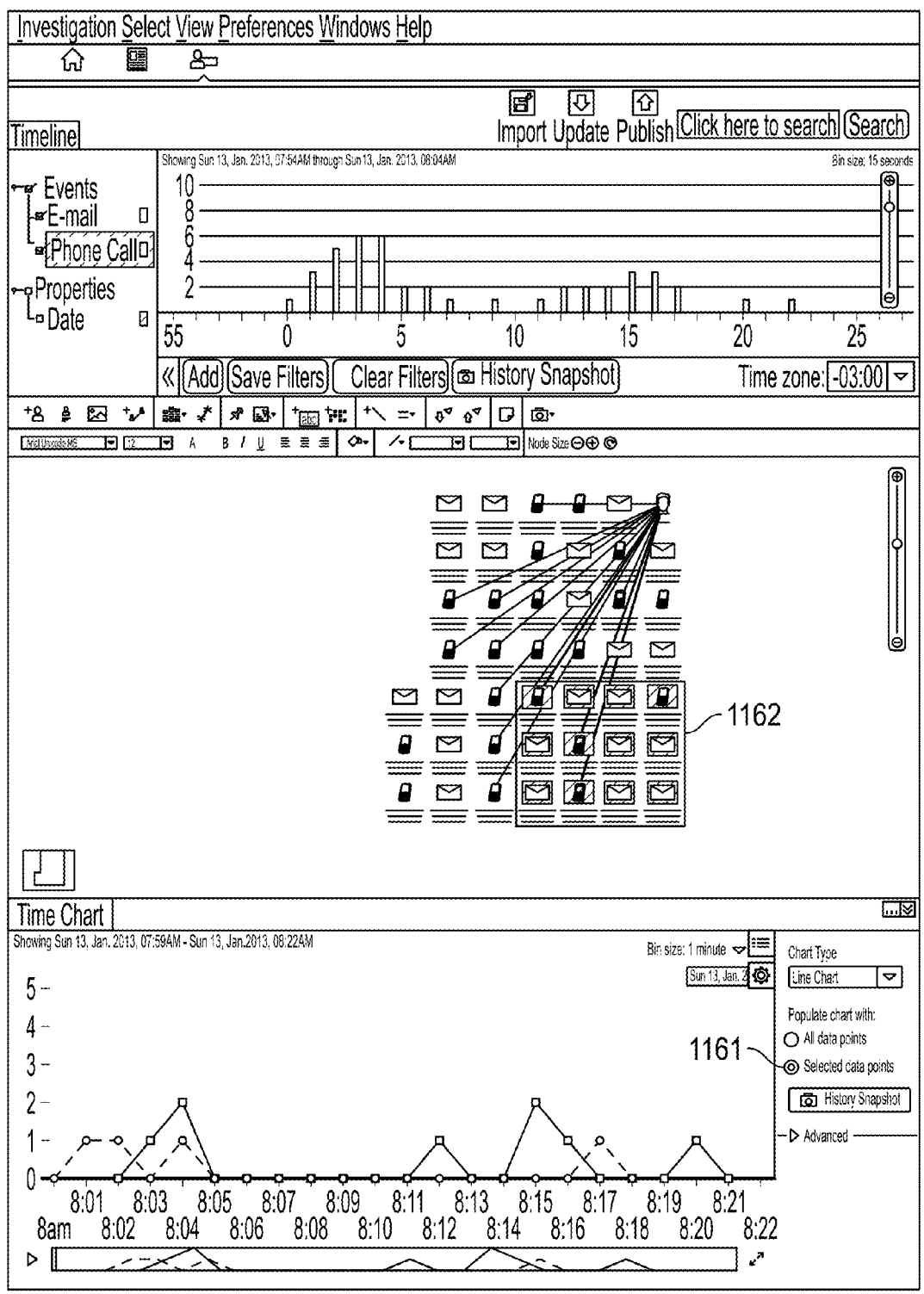
Figure 1P:
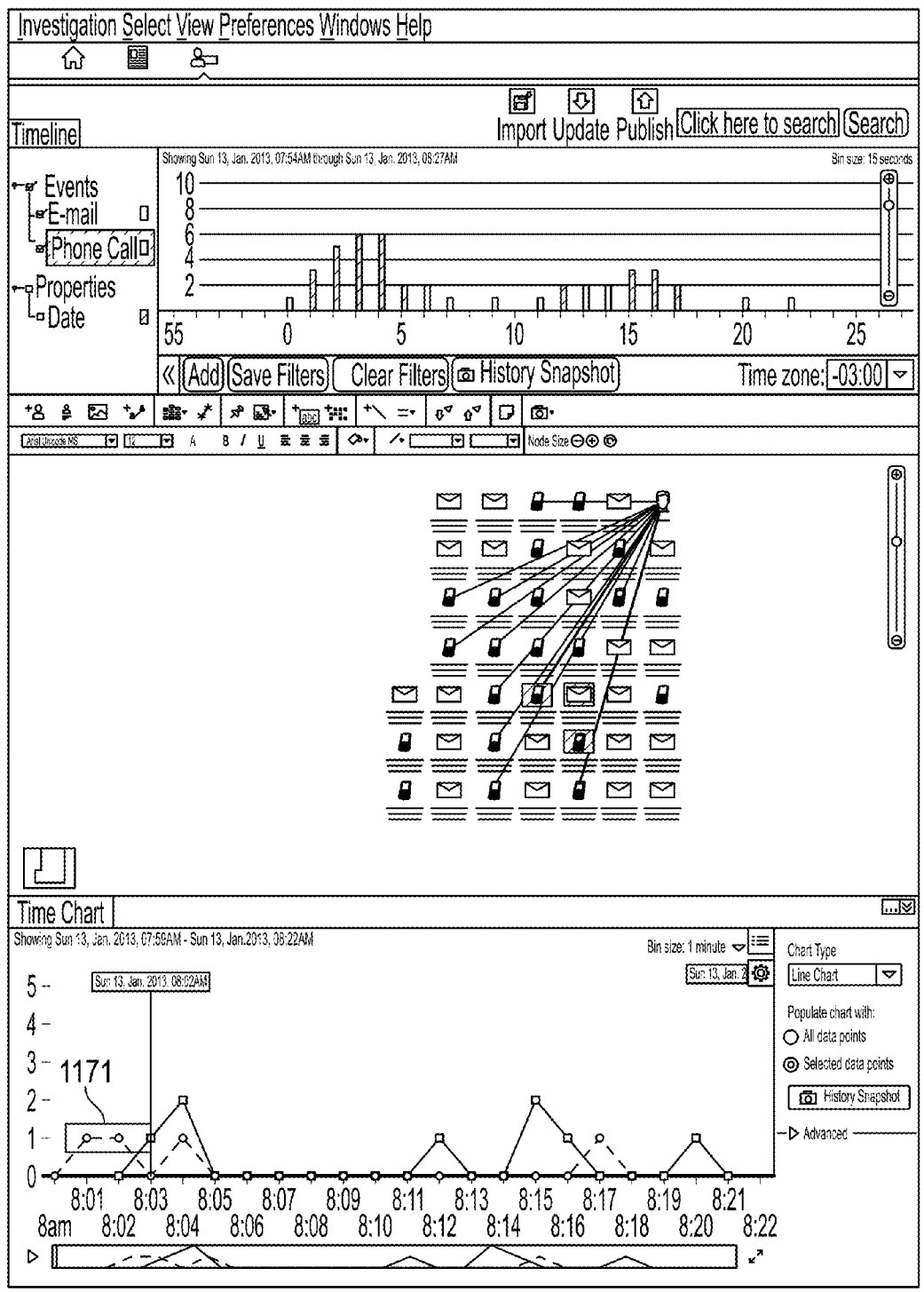
Figure 1Q:
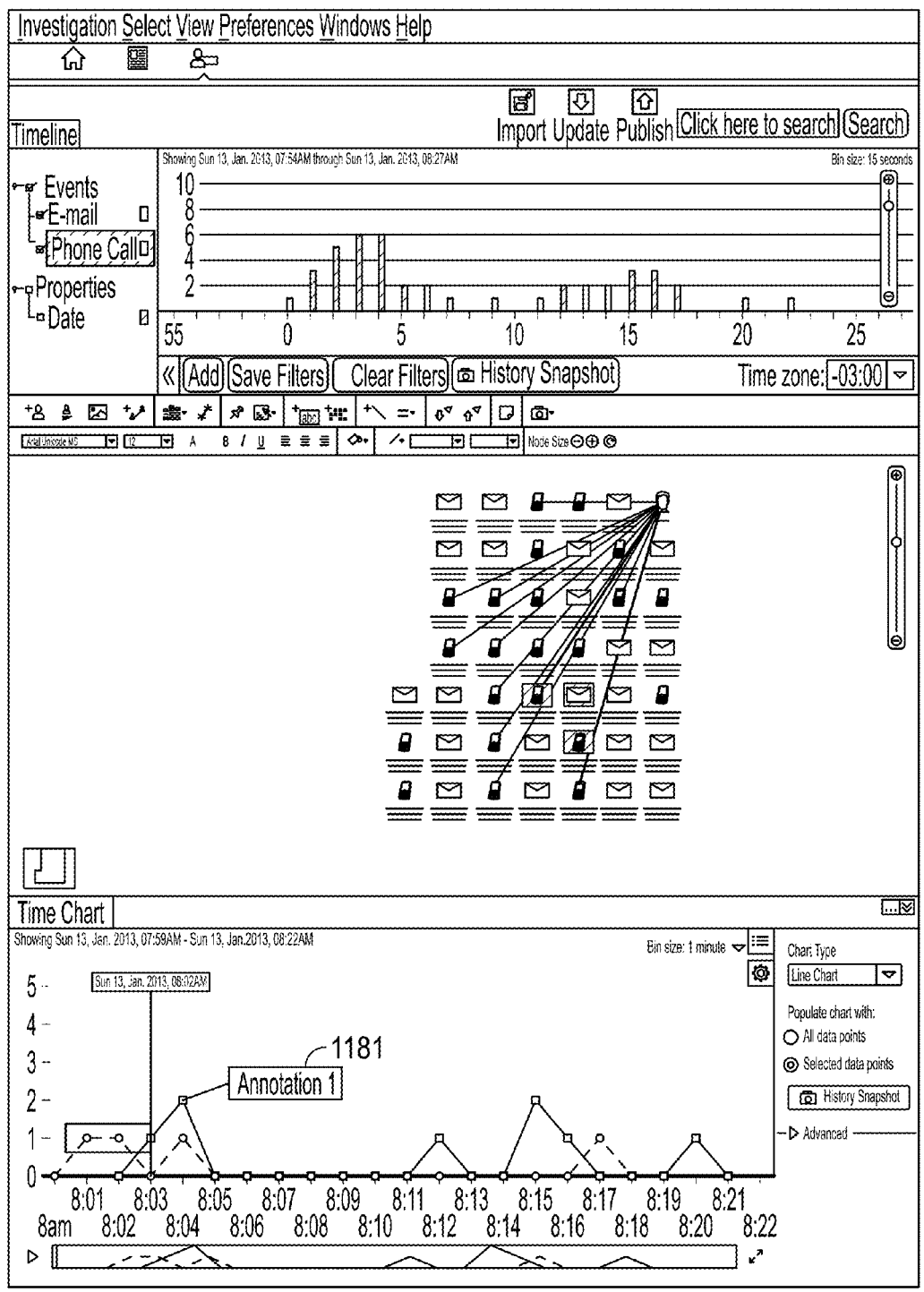

FIGS. 1A-1Q, described below, illustrate example embodiments of user interfaces, and functionality associated with the example user interfaces, of a system including the Time Chart.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a phone call, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
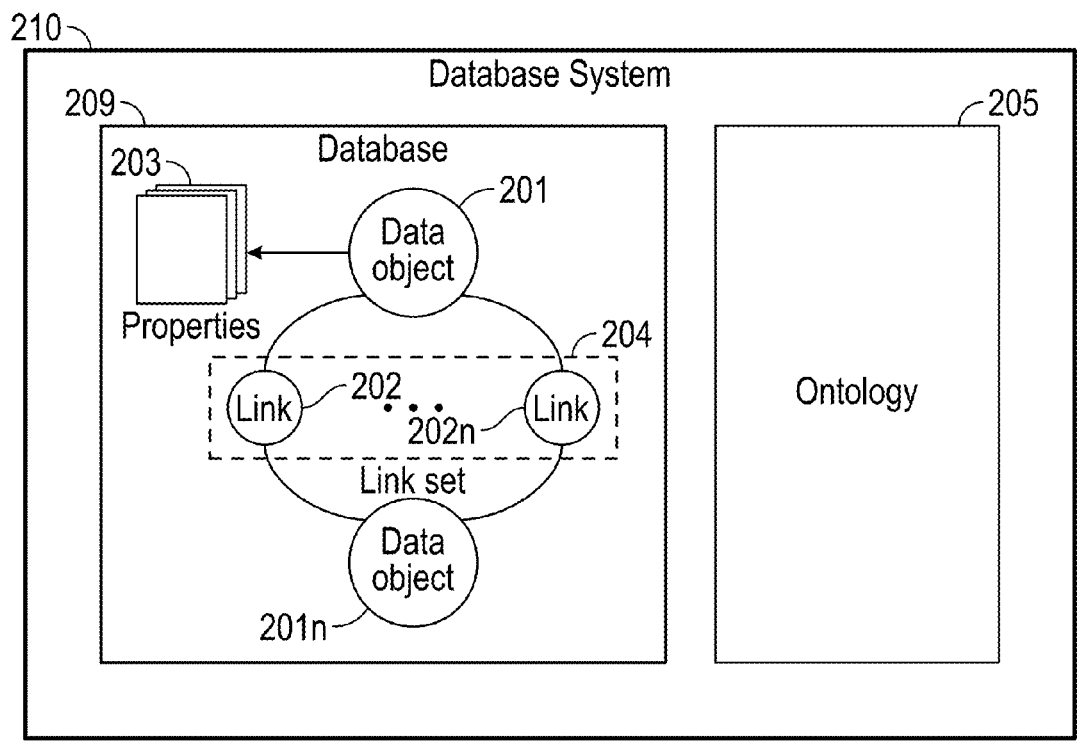
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
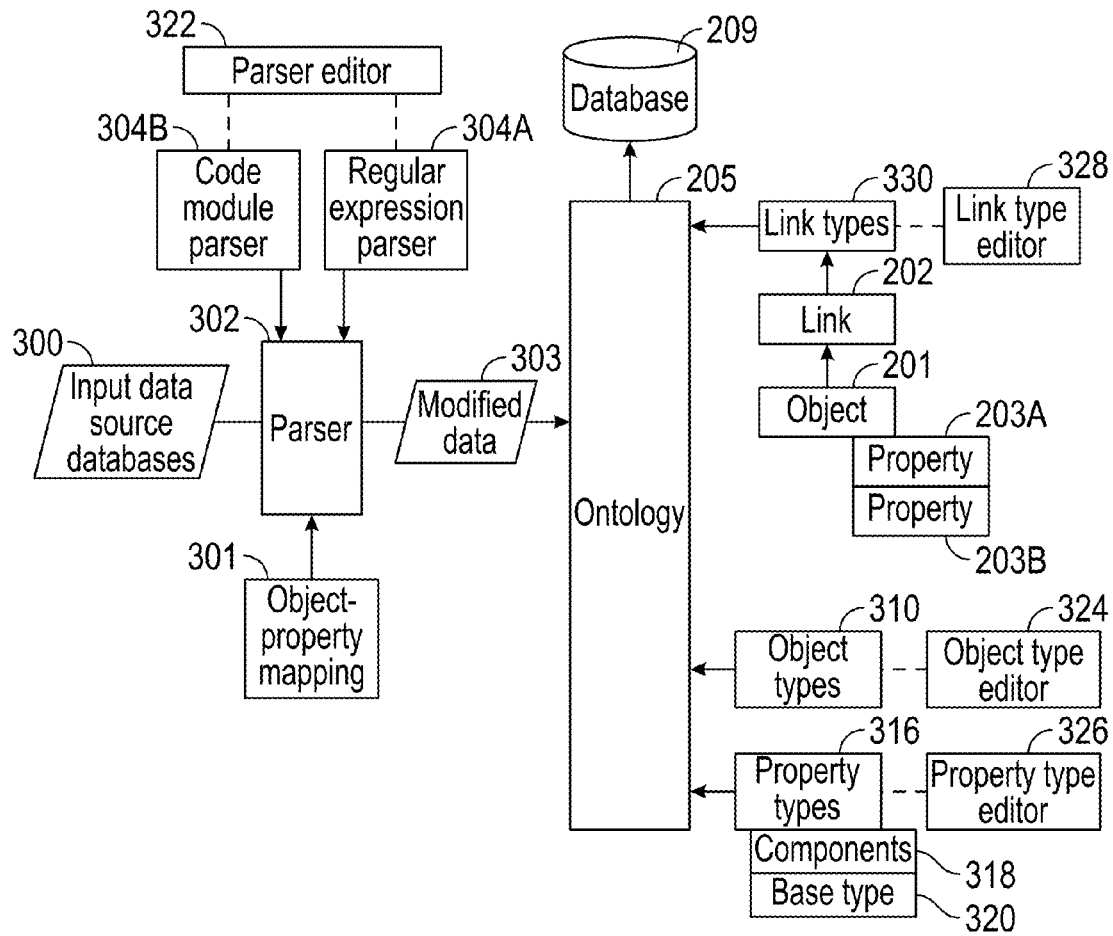
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

The properties, objects, and links (e.g. relationships) between the objects can be visualized using a graphical user interface (GUI). For example, FIG. 4 displays a user interface showing a graph representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes in the example of FIG. 4. In this embodiment, the data objects include person objects 421, 422, 423, 424, 425, and 426; a flight object 427; a financial account 428; and a computer object 429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 4:
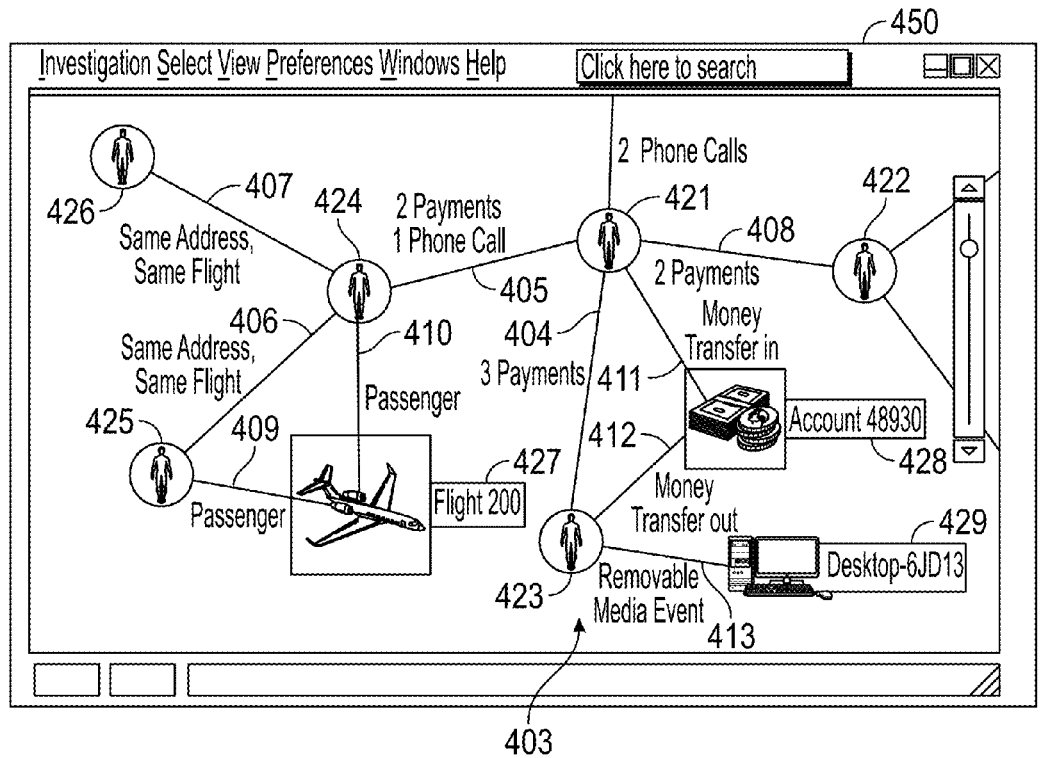
FIG. 4 illustrates a sample user interface using relationships described in a data store using a dynamic ontology.

For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and financial account data object 428. For example, link 411 indicates that person data object 421 transferred money into financial account data object 428, while person data object 423 transferred money out of financial account data object 428. In another example, the relationships between person data objects 424 and 425 and flight data object 427 are indicated by links 406, 409, and 410. In this example, person data objects 424 and 425 have a common address and were passengers on the same flight data object 427. In an embodiment, further details related to the relationships between the various objects may be displayed. For example, links 411 and 412 may, in some embodiments, indicate the timing of the respective money transfers. In another example, the time of the flight associated with the flight data object 427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Time Chart

As described above, FIGS. 1A-1Q illustrate example embodiments of user interfaces, and functionality associated with the example user interfaces, of a system including the Time Chart. It is to be understood that some of the various functionality, features, and aspects of the system as described below in reference to FIGS. 1A-1Q, may or may not appear in any particular embodiment. For example, with many of the user interfaces of FIGS. 1A-1Q include both a Timeline and a Time Chart (as described below), in various embodiment the user interface includes only the Timeline or the Time Chart.

FIG. 1A shows an example user interface with various aspects that are similar among FIGS. 1A-1Q, and accordingly the following general description of the user interface of FIG. 1A provides a basis for the descriptions of the remaining figures (FIGS. 1B-1Q). The user interface of FIG. 1A includes a first time-based information display panel 1001 ("Timeline"), an object display panel 1002, and a second time-based information display panel 1003 ("Time Chart"). While the present description is focused on the Time Chart (1003) of the user interface, it is recognized that much of the description of the Timeline (1001) may also be applicable to the Time Chart (in various embodiments). Accordingly, in some embodiments the Time Chart may include one or more aspects of the functionality and/or features of the Timeline.

The object display panel 1002, in various embodiments, may include a display of data objects as described above in reference to FIG. 4. For example, data objects 1006 may be displayed which include a person, multiple emails, multiple phone calls (and/or phone numbers), and various connections among the data objects. As described above, these data objects 1006 may be selected and/or arranged by a user of the system. The various data objects may be associated with time-based properties. For example, a time an email was sent, or a time that a phone call was made. As described below, in various embodiments the Time Chart (and/or Timeline) provide time-based visualizations of the data objects (and/or properties associated with the data objects) to a user such that the user may, for example, determine connections between various data objects, observe flows of information among data objects, and/or generally investigate related data objects.

The Timeline 1001 includes bars (or information bins) 1005 that each indicate an absolute number of various types of objects that are associated with particular time periods (or bins). The time periods (for example, the length of time spanned by each of the time periods) may be adjusted. Accordingly, more or fewer objects may be associated with each time period (or bin), and greater or lesser granularity may be displayed to the user. As shown, the numbers of each type of object included in a given bar are represented by coloring of the bar. The numbers of objects are stacked in each bar such that the total number of objects is shown. On the left of the Timeline, at 1004, a breakdown of the types of objects (including Email and Phone Call events) and associated properties is shown. The various objects/events may be individually selected or deselected such that only selected objects are displayed in the Timeline. Also shown are the colors related each type of object.

Similar to the Timeline, the Time Chart 1003 includes bars (or information bins) 1007 that each indicate absolute numbers of objects associated with each time period (or bin). FIG. 1B shows the Time Chart 1003 in further detail. In the present embodiment the Time Chart includes a chart area 1021, an information panel 1026, a legends panel selector 1022, a tools panel selector 1023, a play button 1024, and a chart overview/viewport 1025.

Markers 1028 indicate portion of the chart that is currently displayed in the chart are 1021. As shown in example Time Chart 1030, the markers may show that a small portion 1031 of the overall charts is displayed in the chart area. Further, the user may move the markers independently or simultaneously to view particular portions of the chart. In an embodiment the Time Chart may additionally include a fit button for fitting all selected object data into the current chart display. In an embodiment the user may use a mouse wheel to expand or compress the viewport.

The information panel 1026 may display legend information and/or tools information. In FIG. 1B tools information is displayed including a dropdown for a user to select a chart types (for example, bar chart or line chart), radio buttons for a user to select what portion of the data objects are to be used to populate the Time Chart (for example, all data points/objects or selected data points/objects), and/or a button to capture history snapshots (for example, capture a snapshot of the currently displayed Time Chart). Other options may include, for example, a selector for choosing which object properties to include in the Time Chart and a selector for choosing which time zone to display on the Time Chart.

In FIG. 1C legend information is displayed including events and/or properties 1027. Various of the legend information may be selected/de-selected and/or may be associated with colors, etc. (similar to the events and properties described above with respect to the Timeline). Thus, in an embodiment, the legend panel may be used to choose which object types to include in the Time Chart.

As described below, the play button 1024 may be used to cause the system to display current Time Chart data, as indicated by a time window, in chronological order. In an embodiment the play button causes the chronological display of information to play in a continuous loop.

FIG. 1D shows an example user interface similar to FIG. 1A in which, in response to the user selecting one of the bars (e.g., bar 1041) in the Timeline, corresponding data objects (e.g., object 1042) in the object display panel are highlighted. Similarly, the user may select a bar (e.g., bar 1043) in the Time Chart to cause the objects to be highlighted. In an embodiment, selecting a bar in one of the Timeline or Time Chart may cause a corresponding bar in the other to be highlighted.

FIG. 1D shows an example user interface similar to FIG. 1A in which the user has selected a window of time 1051. In various embodiments the user may move the beginning and end of the window of time, and/or may move the entire window to time (to, for example, scrub the window along the Timeline or Time Chart). As shown, in the object display panel any objects not within the window of time are greyed out (e.g., object 1052), while the objects within the window of time are not greyed out (e.g., object 1053).

FIG. 1F shows an example user interface similar to FIG. 1A in which the user has de-selected the "Phone Call" object type 1061. Accordingly, the example user interface the phone call objects are no longer represented in the Timeline. As shown, when the user selects an information bin 1062 in the Timeline, the corresponding objects that are highlighted (e.g., object 1065) in object display panel show that none of the objects include phone call objects. In Time Chart, the highlighted portion of information bin 1063 represents object types still selected (e.g., Email), while the un-highlighted portion 1064 represents un-selected object type (e.g., phone call).

Similar to FIG. 1D, FIG. 1G shows an example user interface similar to FIG. 1A in which, in response to the user selecting one of the bars (e.g., bar 1071) in the Time Chart, corresponding data objects (e.g., object 1072) in the object display panel are highlighted. As shown, because the phone call object type has been re-selected (1070), phone call objects included in the Time Chart and are accordingly selected in the object display panel.

FIG. 1H shows an example user interface similar to FIG. 1A in which multiple information bins 1081 in the Time Chart are selected (and corresponding objects are highlighted in the object display panel.

FIG. 1I shows an example user interface similar to FIGS. 1A and 1D in which the user has selected a window of time 1091 on the Time Chart. As shown, objects that are not within the window of time are greyed out (e.g., object 1095), while objects that are within the window of time are not greyed out (e.g., object 1094). Additionally, as shown, objects corresponding to the selected bars of the Time Chart (1092) may still be highlighted (e.g., object 1093). In an embodiment, the user may select the play button 1096 to cause the window of time to automatically and smoothly move along Time Chart as indicated by arrow 1097. Such automatic and smooth movement of the window of time along the time chart may be referred to herein as the window of time moving in an "animated fashion." As used herein, the term "animated fashion" is a broad term encompassing its ordinary and customary meaning, and includes but is not limited to any type of movement and/or shape change of a displayed element (e.g., a graphical element such as the window of time 1091). Accordingly, movement of the window of time 1091 in an animated fashion as indicated by arrow 1097 means, in an embodiment, that the window of time 1091 appears to a user to slide along the Time Chart, sequentially entering and encompassing each of the bars of the Time Chart, until an end of the Time Chart is reached. In some instances, when an end of the Time Chart is reached, the window of time 1091 may gradually slide off the end and wrap around to a beginning of the Time Chart and continue. Alternatively, the window of time 1091 may stop when the end of the Time Chart is reached. In some embodiments, when only a portion of the whole Time Chart is viewable by the user due to, for example, a view of the Time Chart being zoomed in, as the window of time 1091 progresses along the Time Chart in the animated fashion, the Time Chart itself may begin to scroll along in an animated fashion to reveal additional portions of the Time Chart as the window of time 1091 advances. As the window of time moves along the Time Chart in an animated fashion, corresponding objects are greyed out or not greyed out based on the location of the window. As mentioned above, in an embodiment the play button causes the movement of the window to continuously loop back to the beginning of the Time Chart when the end of the Time Chart is reached.

FIG. 1J shows the user interface of FIG. 1I after the window of time has moved (e.g., slid along the Time Chart in an animated fashion) to location 1111. As shown the indicator 1112 shows the location of the window of time with respect to the entire Time Chart. In various embodiments, not just objects, but connections between objects are highlighted and/or greyed/not greyed out based on user selections and/or the location of the window of time on the Time Chart. In an embodiment, a size of the window of time may be automatically determined by the system. For example, the size of the window of time may be determined based on one or more of: a percentage of time represented in the Time Chart, a percentage of objects represented in the Time Chart, a number of objects represented in the Time Chart, an amount of time represented in the Time Chart, and/or any other factor or item of information. In an embodiment, the user may adjust speed at which the window moves along the Time Chart when the play button is selected. In an embodiment, the system may determine a speed at which the windows moves (which may be determined based on any of the factors or items of information mentioned above with respect to the size of the window).

FIG. 1K shows an example user interface similar to FIG. 1A in which the user may adjust information bin size by selection from the dropdown 1121. In an embodiment, the bin size may be automatically determined by the system based on, for example, an amount of time represented and/or a number of objects represented in the Time Chart.

FIG. 1L shows an example user interface similar to FIG. 1A in which the user may change the Time Chart from Bar Chart to Line Chart via a dropdown 1131. FIG. 1M shows an example of the Line Chart version 1141 of the Time Chart. As shown, different colors of lines may represent different types of objects/events (e.g., purple line 1142 represents Phone Calls, while blue line 1143 represents Emails). In the Line Chart embodiment shown, objects represented in Time Chart are not stacked (as in Bar Chart).

FIG. 1N shows an example user interface similar to FIG. 1M in which a Line Chart version of the Time Chart is shown. As shown, the user may select a portion or region 1151 of the Time Chart that may include only object of particular types for select time periods. Accordingly, in the example show, the user has selected four phone calls and eight emails. The user may select portions of the Line Chart, rather than particular information bins (as in the Line Chart version of the Time Chart). As shown, objects corresponding to the selected portion of the Line Cart are highlighted in object display pane.

FIG. 1O shows an example user interface similar to FIG. 1A in which the user has selected a particular subset of objects 1162 in the object display pane. The user may select the "Selected data points" radio button 1161 in the tools pane so that Time Chart only shows a representation (e.g., bars or lines) of the selected subset of objects. FIG. 1P shows an example of the user selecting a portion or region 1171 of the Time Chart (which includes only the subset of objects selected in the object display panel as shown in FIG. 1O) and the corresponding objects being highlighted in the object display panel.

FIG. 1Q shows an example user interface similar to FIG. 1A in which a user may add an annotation 1181 to the Time Chart. In various embodiments the user may add annotations to particular objects, groups of objects, information bins (e.g., bars or points), and/or other items on the Time Chart.

In some embodiments the window of time may be referred to as a filter (e.g., a Time Chart or Timeline filter).

In various embodiments, the object display panel 1002 described above in reference to various figures may be replaced with another view of data objects. For example, rather than a graph layout or graph representation of data objects, object display panel 1002 may include data objects shown in another format and/or layout. Such other formats and/or layouts may include, for example, histograms of data objects, data object represented on a map, data objects displayed in a postboard view, data objects displayed in a list, data objects displayed in a reader view, and/or the like. Other formats may further include, e.g., any representation of data objects in graphs, maps, tables, timelines, histograms, and/or lists, among other types of data visualizations. Examples of such formats of display of data objects are described in U.S. Pat. No. 8,713,467, titled "Context-Sensitive Views," the disclosure of which is hereby incorporated by reference herein in its entirety and for all purposes.

As with the graph layout of the object display panel 1002 described above, other views of data objects in various other embodiments may function similarly. For example, the user may select data objects via the object display panel 1002 which may then be shown in, e.g., the Timeline and Time Chart. Further, when data objects are selected (e.g., by a user and/or as a window of time scrolls along) in any display (e.g., object display panel 1002, the Timeline, and/or the Time Chart) corresponding data objects in one or more of the other views the may be highlighted or indicated, as described above.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
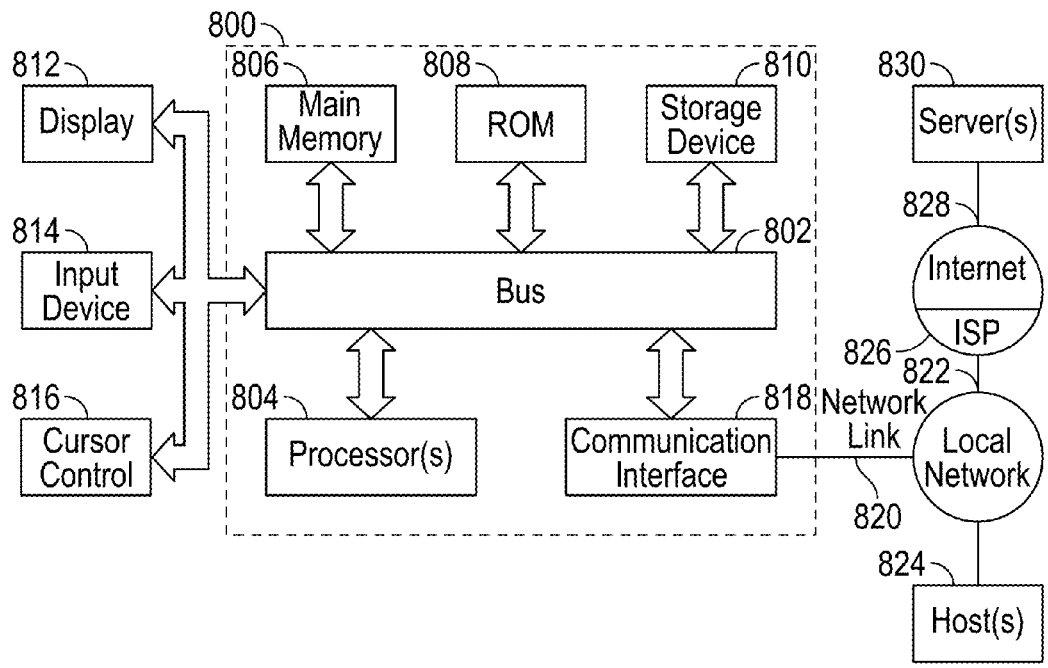
FIG. 5 illustrates a computer system with which certain methods discussed herein may be implemented.

For example, FIG. 5 is a block diagram that illustrates a computer system 800 upon which an embodiment may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Additional Embodiments

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "continuous" as used herein, is a broad term encompassing its plain an ordinary meaning and, as used in reference to various types of activity (for example, scanning, monitoring, logging, and the like), includes without limitation substantially continuous activity and/or activity that may include periodic or intermittent pauses or breaks, but which accomplish the intended purposes described (for example, continuous scanning may include buffering and/or storage of data that is thereafter processed, for example, in batch and/or the like).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
    one or more computer readable storage devices configured to store:
        computer executable instructions; and
        data objects, the data objects associated with one or more properties; and
    one or more hardware computer processors in communication with the one or more computer readable storage devices and configured to execute the computer executable instructions in order to cause the computer system to:
        access a plurality of data objects from the one or more computer readable storage devices;
        generate a data object display panel including visual representations of the plurality of data objects;
        determine a time-based property associated with the plurality of data objects;
        generate a time-based display panel separate from the data object display panel and including a timeline with bars or points along a line that visually represent groups into which the plurality of data objects are placed based on the time-based properties associated with the data objects;
        display the data object display panel and the time-based display panel on an electronic display of the computer system;
        determine a window of time associated with the time-based display panel; and
        in response to receiving an input indicating a selection of a play indicator:
            automatically move the window of time along the time-based display panel in an animated fashion; and
            automatically highlight, in the data object display panel, data objects corresponding to the location of the window of time as it moves along the time-based display panel.

2. The computer system of claim 1, wherein the window of time is determined based on at least one of: a percentage of time represented in the time-based display panel, a percentage of the plurality of data objects represented in the time-based display panel, a number of data objects represented in the time-based display panel, or an amount of time represented in the time-based display panel.

3. The computer system of claim 1, wherein the user may adjust the speed at which the window of time moves along the time-based display panel.

4. The computer system of claim 1, wherein highlighting the data objects comprises greying out any data objects not corresponding to the location of the window of time.

5. The computer system of claim 1, wherein, in response to an input indicating a selection of one or more of the bars or the points along the line, highlighting corresponding data objects in the data object display panel.

6. The computer system of claim 1, wherein the data object display panel and the time-based display panel are simultaneously displayed on the electronic display of the computer system.

7. The computer system of claim 1, wherein the one or more hardware computer processors are configured to execute the computer executable instructions in order to further cause the computer system to:

determine one or more relationships among the plurality of data objects based on the one or more properties associated with respective of the plurality of data objects, wherein the data object display panel includes the plurality of data objects in a graph layout, the graph layout including indications of the one or more relationships.

8. The computer system of claim 7, wherein the graph layout comprises graphical icons representing each of the plurality of data objects, and wherein the indications of the one or more relationships comprise graphical lines connecting respective graphical icons representing related data objects.

9. The computer system of claim 1, wherein the data object display panel includes the plurality of data objects in at least one of a histogram, a table, a list, or a map.

* * * * *